US009912131B2

(12) United States Patent
Zinser

(10) Patent No.: US 9,912,131 B2
(45) Date of Patent: **\*Mar. 6, 2018**

(54) CABLE STRIPPING TOOL

(71) Applicant: WEZAG GmbH Werkzeugfabrik, Stadtallendorf (DE)

(72) Inventor: Roman Zinser, Neustadt (DE)

(73) Assignee: WEZAG GMBH WERKZEUGFABRIK, Stadtallendorf (DE)

( * ) Notice: Subject to any disclaimer, the term of this patent is extended or adjusted under 35 U.S.C. 154(b) by 243 days.

This patent is subject to a terminal disclaimer.

(21) Appl. No.: 14/804,450

(22) Filed: Jul. 21, 2015

(65) Prior Publication Data

US 2016/0020589 A1 Jan. 21, 2016

(30) Foreign Application Priority Data

Jul. 21, 2014 (EP) .................................... 14177826

(51) Int. Cl.
*H02G 1/12* (2006.01)

(52) U.S. Cl.
CPC ......... *H02G 1/1212* (2013.01); *H02G 1/1236* (2013.01)

(58) Field of Classification Search
CPC ........................... H02G 1/1212; H02G 1/1236
(Continued)

(56) References Cited

U.S. PATENT DOCUMENTS

| 4,485,696 A | 12/1984 | Bieganski |
| 5,713,132 A | 2/1998 | Tarpill |

(Continued)

FOREIGN PATENT DOCUMENTS

| CN | 101567531 A | 10/2009 |
| DE | 4205194 | 7/1993 |

(Continued)

OTHER PUBLICATIONS

Undin H, STNEasy, Brochure No. 1132660000/07/2009/SMMW, Display from WPINDEX, Wire stripping pliers e.g. for wires covered with hard isolating material—has swivelling handle joined to attachment, which blocks movement of stripping jaws until pre-set pressure is applied, 2015, 2 pages.

(Continued)

*Primary Examiner* — Hadi Shakeri
(74) *Attorney, Agent, or Firm* — Thomas | Horstemeyer, LLP

(57) ABSTRACT

The invention relates to a cable stripping tool (1). A cable stripping unit (5) is built with two cable stripping jaws (6, 7). The cable stripping jaws (6, 7) are pivoted towards each other in a pivot plane (9) during a cutting stroke. During a subsequent cable stripping stroke the cutting jaws (6, 7) are moved along a cable stripping axis (15). A mounting axis (58, 59) has an orientation vertical to the pivot plane (9). A cutting element (10, 11) is detachably mounted along the mounting axis (58, 59) with the cable stripping jaw (6, 7). Outside from an exchange position the cutting element (10, 11) is blocked against the removal along the mounting axis (58, 59). The exchange position is induced by the drive (16) of the cable stripping tool (1). In the exchange position the cutting element (10, 11) is freed with respect to a movement along the mounting axis (58, 59) so that demounting of the cutting element (10, 11) and mounting of a new cutting element (10, 11) is possible.

18 Claims, 13 Drawing Sheets

(58) Field of Classification Search
USPC .......................................................... 81/9.43
See application file for complete search history.

(56) References Cited

U.S. PATENT DOCUMENTS

| | | | | |
|---|---|---|---|---|
| 5,724,871 A * | 3/1998 | Wall | ..................... | H02G 1/1212 |
| | | | | 81/9.43 |
| 6,023,805 A * | 2/2000 | Lin | ......................... | B25F 1/003 |
| | | | | 7/118 |
| 6,253,641 B1 | 7/2001 | Tarpill | | |
| 6,910,401 B2 * | 6/2005 | Tapper | ................. | H02G 1/1212 |
| | | | | 30/90.1 |
| 7,841,260 B2 | 11/2010 | Storm et al. | | |
| 7,900,537 B2 * | 3/2011 | Hanning | .............. | H02G 1/1241 |
| | | | | 30/91.1 |
| 7,913,588 B2 | 3/2011 | Storm et al. | | |
| 2011/0138629 A1 | 6/2011 | Liu | | |
| 2013/0097786 A1* | 4/2013 | Hardinge | ................ | B25F 1/003 |
| | | | | 7/128 |

FOREIGN PATENT DOCUMENTS

| | | |
|---|---|---|
| DE | 202008014110 | 4/2009 |
| DE | 202008014111 | 4/2009 |
| DE | 202008000596 | 12/2009 |
| EP | 1324448 | 7/2003 |
| EP | 2056415 A2 | 5/2009 |

OTHER PUBLICATIONS

Rennsteig Werkzeuge GmbH: Brochure "2013/2014: Kavelverarbeitung" Cable and Connector Tools, Viernau, Germany, 3 pages.

\* cited by examiner

CABLE STRIPPING TOOL

CROSS REFERENCE TO RELATED APPLICATIONS

The application claims priority to co-pending European Patent Application No. EP 14 177 826.6, filed Jul. 21, 2014.

FIELD OF THE INVENTION

The present invention generally relates to a cable stripping tool, which is used for removing of an encasing insulation of a cable. The cable stripping tool may have a drive operated by an external power, especially a hydraulic or electrical drive. Preferably, however, the cable stripping tool is a hand-operated cable stripping tool, within which a drive is formed with two hand levers, onto which the user may apply actuating hand forces.

BACKGROUND OF THE INVENTION

The stripping of a cable using a cable stripping tool necessitates the following working steps:

First the cable is inserted into the cable stripping tool in an insertion position of the cable stripping tool.

Then a clamping of the cable and an at least partial severing of the insulation encasing the conductor takes place in a cutting stroke, in which knives are moved with a movement being directed radially to the longitudinal extension of the cable.

Finally in a cable stripping stroke the knives placed in the cuts of the encasing insulation are moved in a direction being coaxial to the longitudinal axis of the cable. By this movement the axial portion of the encasing insulation severed in the cutting stroke and related to the free end of the cable is pulled off the conductor line located therein.

For enabling the cutting stroke on the one hand and the cable stripping stroke on the other hand, hand levers of known cable stripping tools operate a gear drive, which for inducing the cutting stroke causes a pivoting motion of pliers jaws towards each other in a pivot plane and on the other hand for the cutting stroke causes an movement of a draw shackle having an orientation coaxial to a longitudinal axis of the cable. A cable stripping unit formed with two cable stripping jaws is housed between the pliers jaws in such a way that during the cutting stroke the pivoting of the pliers jaws towards each other also causes a pivoting of the cable stripping jaws towards each other. On the other hand the cable stripping unit is supported slidingly with respect to the pliers jaws so that during the cable stripping stroke (at unchanged pivot angles of the pliers jaws as well as of the cable stripping jaws) a sliding movement of the cable stripping unit having an orientation coaxial to the longitudinal axis of the cable can be caused by the movement of the draw shackle linked to the cable stripping unit. The cable stripping jaws of the cable stripping unit in the end portion facing away from the linking point of the draw shackle support the knives. On the one hand the knives are responsible for cutting of the encasing insulation. On the other hand the knives also serve for the pulling-off of the axial portion of the encasing insulation. Such cable stripping tools are known for example from the documents DE 42 05 194 C1; EP 1 324 448 A2 (corresponding to U.S. Pat. No. 6,910,401 B2), DE 20 2008 014 110 U1 (corresponding to U.S. Pat. No. 7,913,588 B2) and U.S. Pat. No. 4,485,696 A.

Due to wear of the knives an exchangeability of the cable stripping unit or of the knives is desired. It is also possible that (dependent from the intended use of the cable stripping tool) usage with different knives might be desired. For example for usage of the cable stripping tool for cables with different diameters of the conductor and/or of the insulation or different types of cables the use of different cable stripping units or knives might be necessary. It is possible, for example, that with the same cable stripping tool the alternative use of knives

- which are formed with separate, possibly resiliently supported lamellae,
- which have a straight cutting edge,
- the cutting edge of which is adapted to the contour of the insulation or the conductor,
- which are formed with two knife blades with cutting edges inclined towards each other in a V-shape, and/or
- which are formed with a cutting edge which has several concavely arched blade portions next to each other for cables of differing cross sections is to be enabled.

In order to ensure an exchangeability of the knives the document DE 20 2008 000 596 U1 (corresponding to U.S. Pat. No. 7,900,537 B2) suggests that into the cable stripping jaws connected pivotably with the draw shackle on the inner sides turned towards each other a knife cassette each can be inserted. The knife cassettes have side walls, which in their mounted state are housed between the respective side walls of the cable stripping jaws. A latching is achieved between the side walls of the knife cassette and the respective cable stripping jaw. For this purpose in the knife cassette a wire spring bent into a U-shape is supported, the end portions of which extend from the front side of the knife cassette. In the latched state the base arm of the U of the wire spring engages into a slit of the side wall of the cable stripping jaw. For release of the latching and removal of the knife cassette from the cable stripping jaws it is necessary that the user presses the end pieces of the wire springs extending from the front side of the knife cassette towards each other in such a way that the base arm of the U of the wire spring exits from the slit of the cable stripping jaw.

DE 20 2008 014 111 U1 (corresponding to U.S. Pat. No. 7,841,260 B2) describes an exchange of the knives by an exchange of the cable stripping jaws. For this purpose it is necessary that a bearing bolt which fixes a pliers jaw is demounted from the cable stripping tool. Only then pivoting of an upper cable stripping jaw upwards is possible so that the cable stripping jaw can be removed from a yoke of the draw shackle. For an upper cable stripping jaw demounted in this way the lower cable stripping jaw can also be pivoted upwards and then also be removed from the yoke of the draw shackle. Subsequently other cable stripping jaws with knives with a different cutting-edge shape can be mounted with the yoke of the draw shackle.

From a brochure of the company Weidmëller with brochure No. 1132660000/07/2009/SMMW a cable stripping tool marketed under the trademark "STRIPAX®" is known. Here, a simple exchange of knives is intended to take place by first demounting the upper pliers jaw from the cable stripping tool. Subsequently the cable stripping unit with the two cable stripping jaws, which support the knives, can be removed from the cable stripping tool as a unit and exchanged by another cable stripping unit.

By the company JOKARI-Krampe GmbH a cable stripping tool "Sensor Special No. 20300" is marketed in which exchangeable knife blocks are held by pliers jaws. In this case the knife blocks are realized as massive metallic form pieces having a complex form, which integrally form the cutting edges as well as a mounting element built by a protrusion. The mounting element can be inserted into a mounting groove of the pliers jaws from the side in the direction of a mounting axis. In the mounted state of the knife blocks these are secured on the one hand by a two-component adhesive and on the other hand by securing clamps. The exchange of the knife blocks requires a plastic deformation of the securing clamps as well as loosening of the two-component adhesive.

From the brochure "2013/2014: Kabelverarbeitung" of the company RENNSTEIG Werkzeuge GmbH (printing identification "rwz 06-2013/A-5000") a cable stripping tool marketed under the identification "MultiStrip 10" is known, in which the cable stripping unit formed with the pivotable cable stripping jaws is removable. Knives are each screwed to the front sides of the cable stripping jaws. Since the screws holding the knives in a mounted state of the cable stripping unit are covered by the pliers jaws and by the clamping jaws for the cable assigned to the pliers jaws, an exchange of the knives in any case requires a disassembly of the cable stripping unit.

The documents U.S. Pat. No. 5,713,132 A, U.S. Pat. No. 6,253,641 B1 and US 2011/0138629 A1 do not relate to cable stripping tools of the present type. Instead, the tools described in these documents only have a cutting stroke, but not a following cable stripping stroke caused by means of a drive. Accordingly, for these tools for a cable stripping the cable needs to be pulled manually while the insulation previously cut during the cutting stroke has to be held back by the cable stripping tool.

SUMMARY OF THE INVENTION

The present invention relates to a cable stripping tool with an exchangeable cutting element as well as a cutting element which is improved with respect to the effort and safety for mounting and demounting.

The invention also relates to a cable stripping tool with at least one cable stripping jaw, on which a cutting element is held exchangeably. Preferably the cable stripping tool has two cable stripping jaws on each of which a cutting element is held exchangeably. Mounting of the cutting element on the cable stripping jaw is achieved by mounting the cutting element on the cable stripping jaw along a mounting axis. For example this mounting along the mounting axis is done according to the previously referred-to prior art of the company JOKARI-Krampe GmbH by inserting the protrusion of the cutting element realized as a knife block into the mounting groove prescribing the mounting axis. It is understood that manifold other options for mounting are given, for example with any straight or curved course and/or any orientation of the mounting axis, insertion of protrusions or studs of the cutting elements (or the cable stripping jaw) into a recess of the cable stripping jaw (or the cutting element) and the like.

The cable stripping tool according to the invention might have a cable stripping unit formed with two cable stripping jaws, which may be fixedly provided at the cable stripping tool or may be demountable. For this embodiment both cable stripping jaws are pivotable towards each other by a drove, especially by operation of hand levers and a gear joint interposed between the hand levers and the cable stripping jaws. In this way the cutting stroke is formed. The movement of the two cable stripping jaws takes place in a pivot plane. At the end of the cutting stroke the cutting elements mounted with the cable stripping jaws have at least partially severed the insulation encasing the cable. In a cable stripping stroke following the cutting stroke by means of the drive the two cable stripping jaws are then movable along a cable stripping axis. Then, in this way the end sided axial portion of the encasing insulation (which before that has been severed at least partially) is pulled off the conductor. For this embodiment according to the invention the mounting axis (and, if applicable, the longitudinal axis of a mounting groove) has an orientation vertically to the pivot plane of the cable stripping jaws and/or vertically to the cable stripping axis. Accordingly, the cutting element and the mounting groove are accessible for the user "from the side" in an especially easy way. On the other hand such an orientation of the mounting axis may have the consequence that during the cutting stroke and during the cable stripping stroke no forces caused by the cutting and the cable stripping are applied to the cutting element which act in the direction of the mounting axis and therefore strive to demount the cutting element from the cable stripping jaw or to change the position.

For one embodiment the invention might be based on the observation that according to the prior art mentioned above the mounting or demounting requires complex working steps, which especially include the steps of mounting and demounting of the complete cable stripping unit, the screwing of the knives to the cable stripping jaws at the front side, the application and the loosening of a two-component adhesive and the plastic deformation of securing clamps.

The invention also suggests that motion-controlled by a drive of the cable stripping tool an exchange position of the cable stripping tool can be induced. While in at least one other position or a region of positions the cutting element is blocked with respect to a movement along the mounting axis to avoid especially an unintentional loosening of the cutting element from the cable stripping jaw or that the cutting element takes an undesired position in relation to the cable stripping jaw, in the exchange position the cutting element is freed. Due to freeing the cutting element the securing of the cutting element with respect to the cable stripping jaw is at least reduced, preferably completely removed, so that a movement along the mounting axis is possible. In this way in the exchange position a mounting of a cutting element with the cable stripping jaw may be performed as well as demounting of another cutting element. Without especially a plastic deformation of a securing clamp, the application or removal of a two-component adhesive, the employment of a tool such as a screwdriver for screwing the cutting element to the cable stripping jaw being necessary, by operation of the drive alone the exchange position can be induced and in the exchange position a securing effect for the cutting element may be reduced or completely removed. For example, in the exchange position the movement of the cutting element along the mounting axis may occur only by overcoming a friction or a latching or locking.

Besides a simplified mounting and demounting for the cable stripping tool according to the invention possibly by one embodiment according to the invention the user safety may also be enhanced because outside from the exchange position a reliable securing of the cutting element with respect to the cable stripping jaw may be provided without the securing effect being dependent on the thoroughness of the user during mounting, especially the thoroughness of the plastic deformation of a securing clamp, the thoroughness of the application of a two-component adhesive and/or the thoroughness of a screwing of a cutting element to the cable stripping jaw.

For another embodiment of the cable stripping tool according to the invention inducement of the exchange position is performed motion-controlled by movement of the cable stripping unit along the cable stripping axis by the drive. This embodiment bases on the finding that during the cable stripping stroke a sliding movement between the cable stripping jaws of the cable stripping unit on the one hand and the pliers jaws on the other hand occurs anyway. This relative movement may be used to induce the freeing of the cutting element in a motion-controlled way. To mention only a simple, non-limiting example, outside from the exchange position a blocking of the cutting position in the mounting direction by a wall of the pliers jaw may result. When reaching the exchange position due to the relative movement between pliers jaw and cable stripping jaw the wall is moved away from the mounting groove and the cutting element in such a way that the cutting element is freed.

It is possible that the drive by which the exchange position has been induced is the drive that is also responsible for operating the pliers jaws and/or the cable removal jaws. For example, the drive may be formed with the hand levers, through which on the one hand the operating forces for processing the work piece are applied and transmitted and on the other hand the exchange position is induced.

An exchange position might be any position of the cable stripping tool. To mention only some examples, the exchange position may be a position which is not reached during a normal operation of the cable stripping tool and during a "normal" working stroke of the cable stripping tool, so that the exchange position is only induced on purpose when mounting or demounting of the cutting element is desired. However, embodiments in which the exchange position is reached or passed during a normal working stroke of the cable stripping tool are also encompassed by the invention. Preferably the exchange position corresponds to an operating position in which the cutting element and the cable stripping jaws are not biased. The exchange position may e.g. also be an opening position of the cable stripping tool in which it is for example possible to insert the work piece into the cable stripping tool and/or remove the work piece from the cable stripping tool. If the exchange position is realized as an opening position of the cable stripping tool, possibly mounting and demounting of the cutting element is simplified even more because in this case the cutting element and the cable stripping jaw are especially accessible.

While generally any possibility of mounting between cutting element and cable stripping jaw are possible, in a further embodiment the invention suggests that the cutting element is held exchangeably on the cable stripping jaw by a positive locking engagement of a mounting element with a mounting groove oriented along the mounting axis. To mention only an example, with the positive locking engagement of the mounting element into the mounting groove a kind of "dovetail joint" in a wider sense may be formed, which also includes contours of the mounting element on the one hand and the mounting groove on the other side which do not conform to the strict form of a "dovetail", as long as a form-locking engagement of at least one undercut is provided. The positive locking engagement according to the invention of a mounting element into a mounting groove on the one hand makes possible a simple insertion along the mounting axis given by the mounting groove. On the other hand the positive locking engagement might enable an exact definition of the orientation of the cutting element with respect to the cable stripping jaw and a good accommodation and transfer of forces between cutting element and cable stripping jaw.

Generally, it is possible that the mounting groove is provided on the cutting element while the cable stripping jaw has the mounting element to be inserted into the mounting groove. In another embodiment of the invention, however, the cable stripping jaw has the mounting groove while the cutting element has the mounting element to be inserted into the mounting groove.

Generally any one- or multi-part realization of the cutting element is possible. In one embodiment of the invention the cutting element is formed with a knife, which is made from metal which at least in the region of the cutting edge has been hardened. Furthermore the cutting element is formed with a holding body, which for example may be made from plastic. Preferably the holding body is material-bonded to the knife. The holding body might be multifunctional:

The holding body might hold the knife and accommodates forces acting on the knife.

Furthermore the holding body might be formed with the mounting groove or the mounting element, so that the holding body in fact forms the interface to the cable stripping jaw and enables the mounting between cutting element and cable stripping jaw.

It is also possible that the holding body improves handling of the cutting element, which may be due to its size or its shape alone.

With the knife and the holding body in particular an integral cutting element is formed. For this embodiment it is possible to limit the use of metal as material to the relevant region, which here is the knife, while for the holding body a lighter and possibly cheaper material is chosen. On the other hand by forming the holding body for example from plastic there may be an influence on its insertion characteristic and on friction characteristics during mounting and demounting. Finally a possible elasticity of the holding body may be purposefully used, for example by forming a locking or latching arrangement between mounting groove and mounting element and/or for an elastic support of the knife.

In another embodiment of the invention the exchange position is disposed at the end of a working stroke of the cable stripping tool. In particular at this end of the working stroke the hand levers of a manual drive are completely closed. It is also possible that at this end of the working stroke the pliers jaws and cable stripping jaws are open to enable a removal of a stripped cable. This opening position can also advantageously be used for a possible exchange of the cutting element.

For another embodiment of the cable stripping tool according to the invention the cutting element outside of the exchange position is blocked in the direction of the mounting axis by a securing element held on the pliers jaw or formed by the latter, so that demounting and an undesired loosening of the mounting element from the cable stripping jaw is not possible. On the contrary, in the exchange position the securing element is moved away from the cutting element to enable mounting and demounting, so that the cutting element is freely accessible.

In a further embodiment of the invention the cable stripping tool has an insertion position. In the insertion position the work piece is inserted into the cable stripping tool. Furthermore there is a clamping position, in which the work piece is clamped between clamping jaws of the cable stripping tool. In a cutting position the work piece has been cut by the cutting element. It is possible that clamping and cutting occurs at the same time. In a removal position the work piece can be removed from the cable stripping tool. The exchange position may be arranged in one of the mentioned positions or before or after the mentioned positions. The mentioned positions are arranged one after another in the mentioned sequence over the working stroke of the cable stripping tool. The cutting stroke is performed between the insertion position and the cutting position while the cable stripping stroke is performed between the cutting position and the removal position. From the insertion position to the clamping and/or cutting position the pliers jaws and the cable stripping jaws together approach one another through pivoting. From the clamping position to the cutting position the pivot angle of the pliers jaws and the cable stripping jaws does not (or not significantly) change. There rather is only a sliding movement of the cable stripping unit with respect to the pliers jaws due to operation of the draw shackle. For achieving the removal position another opening of the pliers jaws and the cable stripping jaws has occurred.

It is possible that the user of the cable stripping tool according to the invention carries with him or her several identical loose cutting elements for an exchange after wearing out and/or different loose cutting elements. It is also possible that the cutting elements are stored in a storage unit or a receptacle separately from the cable stripping tool. In a special embodiment of the cable stripping tool according to the invention the cable stripping tool itself has a storage unit for storing at least one cutting element. It is possible that alternatively or additionally the storage unit also serves for storage of at least one further accessory such as for example a clamping element or a clamping jaw. In this way a compact unit is formed for which it is made certain that when a cable stripping tool is present there are also the cutting elements (and possible further accessories) present which are stored in the storage unit in which way especially a loss of a cutting element or accessory or a time-consuming search for the cutting element or accessory does not occur anymore.

Generally the storage unit may be placed at any place on the cable stripping tool, for example in the region of a head of the cable stripping tool. In another embodiment of the invention the storage unit is placed in the region of a hand lever of the cable stripping tool. The storage unit may, for example, be attached to a base body of the hand lever on an end side, be attached to the hand lever in the region of a side surface of the hand lever or even be integrated into the interior of the hand lever.

In another embodiment the hand lever has a base body as well as a lid. The base body has an open cross section, which can at least partially be closed by the lid. The lid and the open cross section of the base body together limit an interior space of the hand lever. Within this interior space there may be placed the cutting element and/or the clamping element. The lid may form e.g. an element protecting the cutting element and/or the clamping element against loss of from the interior space of the hand lever, a sealing of the interior space and/or an optical closure. It is also possible that by the outer shape of the lid and the base body (in spite of the storage of the cutting element and/or the clamping element in the interior space of the hand lever) an outer contour is provided that is pleasing to the hand of the user.

It is generally possible that the cutting element and/or the clamping element are stored loosely within the interior space. It is also possible that the cutting element and/or the clamping element are held on the base body of the hand lever, which may be realized for example by locking to the base body, screwing to the latter or insertion into a mounting groove formed by the base body. In another embodiment of the invention the cutting element and/or the clamping element is/are held on the lid. This might have the advantage that by flipping open the lid or demounting the lid the cutting element and/or the clamping element is/are especially easily accessible. It is even possible that several lids are assigned to one cable stripping tool which are exchangeable and on which different cutting tools and/or clamping tools each are held. Accordingly the user is able to equip the cable stripping tool with a lid with cutting elements or clamping element which are suitable for its upcoming use, while other cutting elements or clamping elements, which presently are not of an interest, may be stored on a different lid, which then for example may be put into a toolbox.

There are a lot of options for placing the lid on the hand lever as well. It is possible that the lid closes the front side of the cable stripping tool facing away from the hand lever. The lid may have an enlarged surface (and therefore possibly enable storage of a larger number of cutting elements or clamping elements) if the lid is placed in the region of a longitudinal surface of the hand lever. If, for example, the lid is placed on a side of the hand lever which in its mounted state is turned away from the other hand lever, the lid may be removed or swung towards the outside independent of the hand lever without this movement being limited or blocked by the other hand lever. The corresponding applies if the lid is mounted on a side of the hand lever having a surface normal being vertical to the pivot plane of the hand levers. In a preferred embodiment of the invention, however, the lid is placed on the side of the base body which in amounted state of the hand lever faces towards the other hand lever. This embodiment bases upon the finding that when hand forces are applied to the two hand levers there is no pressure applied to this side by the hand of the user. Therefore the lid is not subjected to the hand forces. On the other hand the requirements to the shaping of the lid for the enablement of good haptics of the cable stripping tool for such a placement of the lid are at least diminished. This embodiment of the invention possibly also makes use of the finding that for spread hand levers there remains a sufficient space between the hand levers to mount and demount or pivot open the lid.

There are a lot of ways for fastening and supporting the lid at the base body of the hand lever. To mention only some non-limiting examples, the lid may be screwed, riveted, clipped to the base body or inserted into the base body or the like. For an embodiment according to the invention the lid is pivotably supported on the base body of the hand lever. In this case the lid may have a closing position in which the lid closes the base body of the hand lever at least partially as well as an opening position in which the lid is pivoted away from the base body of the hand lever and which enables the removal and the insertion of cutting elements or clamping elements into the lid or the base body of the hand lever.

In another embodiment of the cable stripping tool in a closing position the lid is locked or latched to the base body of the hand lever.

For an embodiment of the cutting element according to the invention the cutting element has a further function; in this embodiment the cutting element comprises a guiding element or a holding element for a distance element, which forms a stop for the front side of the cable when inserting the cable into the cable stripping tool. In this way the distance element defines the length of the axial portion of the insulation to be removed. It is possible that the distance element is held in a fixed position on the cutting element. It is also possible that the position of the distance element on the cutting element is adjustable. Finally it is possible that the guiding element or holding element cooperates with a corresponding guiding element or holding element of another construction element of the cable stripping tool so that the distance element may be placed both in the area of the cutting element as well as in the area of the other construction element so that a larger adjustment range for the position of the distance element (and therefore the length to be stripped) results. For example a guiding groove formed in the cutting element may extend into another construction element of the cable stripping tool so that the distance element is slidable both in the region of the cutting element as well as in the region of the further construction element. It is also possible that positions of the distance element are secured, for example by a locking or latching arrangement, which may be formed in the region of the cutting element and/or the further construction element (cp. e.g. the locking arrangement according to DE 20 2008 014 111 U1).

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a cutting element, a cable stripping jaw or a mounting groove is mentioned, this is to be understood such that there is exactly one such element or there are two such elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
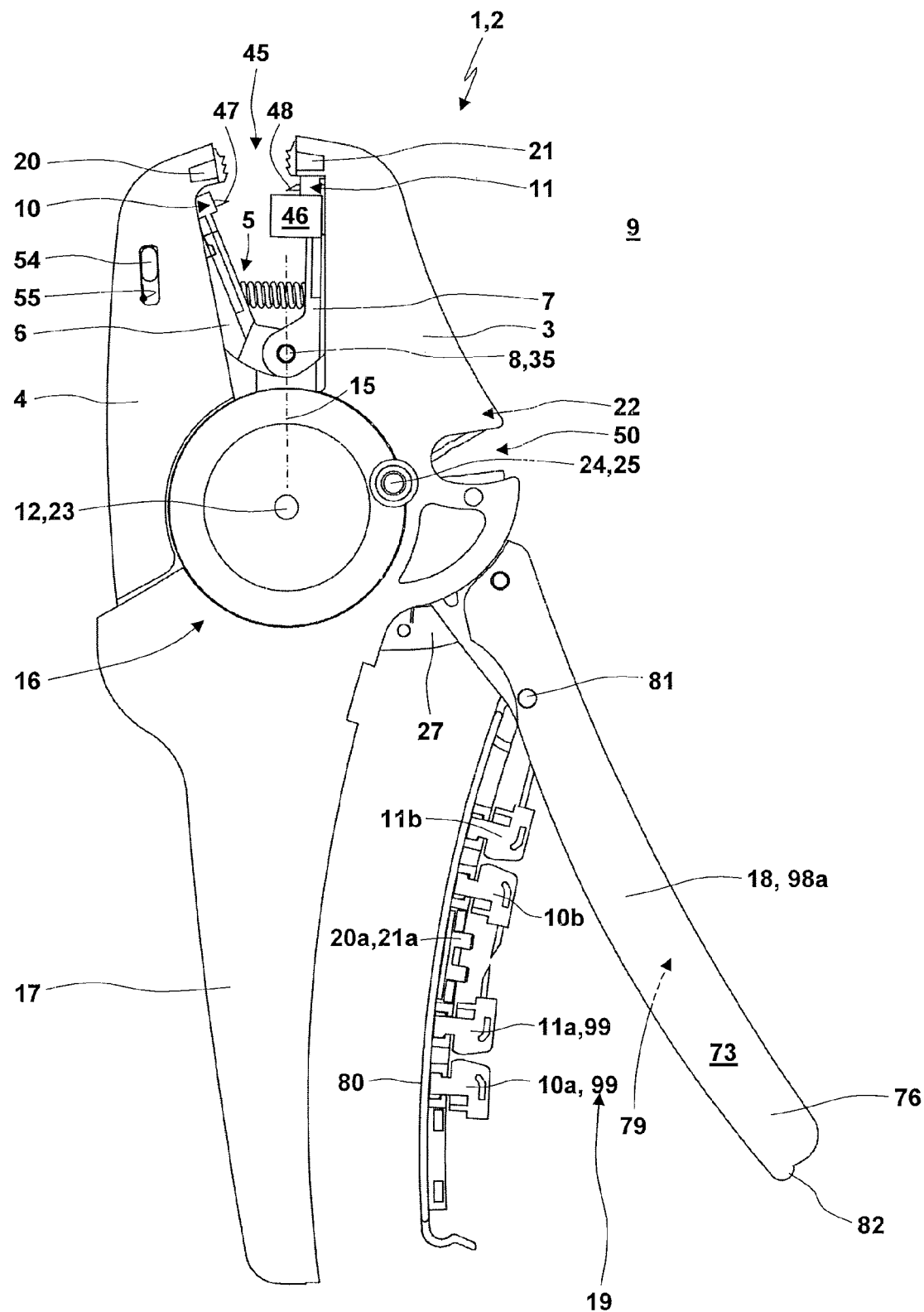
FIG. 1 shows cable stripping pliers in an insertion position with an open storage unit in a top view.

In the figures a cable stripping tool 1 in the shape of hand-operated cable stripping pliers 2 is shown without the invention being intended to be limited to hand-operated cable stripping pliers 2. The cable stripping pliers 2 have two pliers jaws 3, 4. Between the two pliers jaws 3, 4 a cable stripping unit 5 is accommodated, which is formed with two cable stripping jaws 6, 7. The cable stripping jaws 6, 7 are pivotally connected to each other in an end portion through a joint 8 with a pivot plane 9 having an orientation parallel to the plane of illustration according to FIG. 1. The cable stripping jaws 6, 7 in their free end portions each carry a cutting element 10, 11. The pliers jaws 3, 4 are pivotally connected to each other in the pivot plane 9 through a joint 12. Due to a contact of the pliers jaws 3, 4 with the cable stripping jaws 6, 7 and/or the cutting elements 10, 11 via contact surfaces 13, 14 of the pliers jaws 3, 4 a pivoting movement of the pliers jaws 3, 4 towards each other coincides with a pivoting of the cable stripping jaws 6, 7. The pivot angle of the pliers jaws 3, 4 is smaller than the pivot angle of the cable stripping jaws 6, 7 because the distance of the contact surfaces 13, 14 from the joint 12 is larger than the distance of the contact surfaces 13, 14 from the joint 8. Furthermore the cable stripping unit 5 with the cable stripping jaws 6, 7 is relatively slidable along a cable stripping axis 15 without a change of the pivot angle, which is provided by the formation of a sliding contact in the region of the contact surfaces 13, 14. The common pivoting of the pliers jaws 2, 4 on the one hand and the cable stripping jaws 6, 7 on the other hand towards each other forms a cutting or clamping stroke, while the movement of the cable stripping unit 5 along the cable stripping axis 15 without a change of the pivoting angle forms a cable stripping stroke.

A drive 16 causes the cutting stroke as well as the cable stripping stroke. For the embodiment shown, the drive 16 is realized with two hand levers 17, 18 and a gear connection inserted between the hand levers 17, 18 and the pliers jaws 3, 4 and the cable stripping unit 5. During a working stroke of the hand levers 17, 18 with a pivoting of the hand levers 17, 18 towards each other the gear connection subsequently provides the cutting stroke and the cable stripping stroke.

The hand lever 18 forms a storage unit 19, which serves for the storage of further pairs of cutting elements 10a, 11a; 10b, 11b. The cutting elements 10a, 11a; 10b, 11b may be exchanged for the cutting elements 10, 11 mounted with the cable stripping jaws 6, 7. For the embodiment shown the storage unit 19 also stores clamping jaws 20a, 20b; 21a, 21b, which may be exchanged for clamping jaws 20, 21, which are preferably elastically, which may be insertable into the outer end portion of the grooves of the pliers jaws 3, 4 and which hold and fix the cable inserted into the cable stripping pliers 2. While the clamping jaws 20, 21 in the state mounted with the pliers jaws 3, 4 have a comparably large extension in the direction vertically to the plane of projection of FIG. 1, their extension in the direction of the longitudinal axis of the inserted cable is comparably small. In the storage unit 19 the clamping jaws 20, 21 may be stored in a space-saving way without the need of an enlargement of the extension of the hand lever 18 vertically to the plane of illustration if the clamping jaws 20, 21 are stored with their extension in the direction of the longitudinal axis of the cable (for the clamping jaws 20, 21 mounted into the pliers jaws 3, 4) in the direction of the thickness of the hand lever 18 (that is, vertical to the plane of illustration according to FIG. 1).

Figure 2:
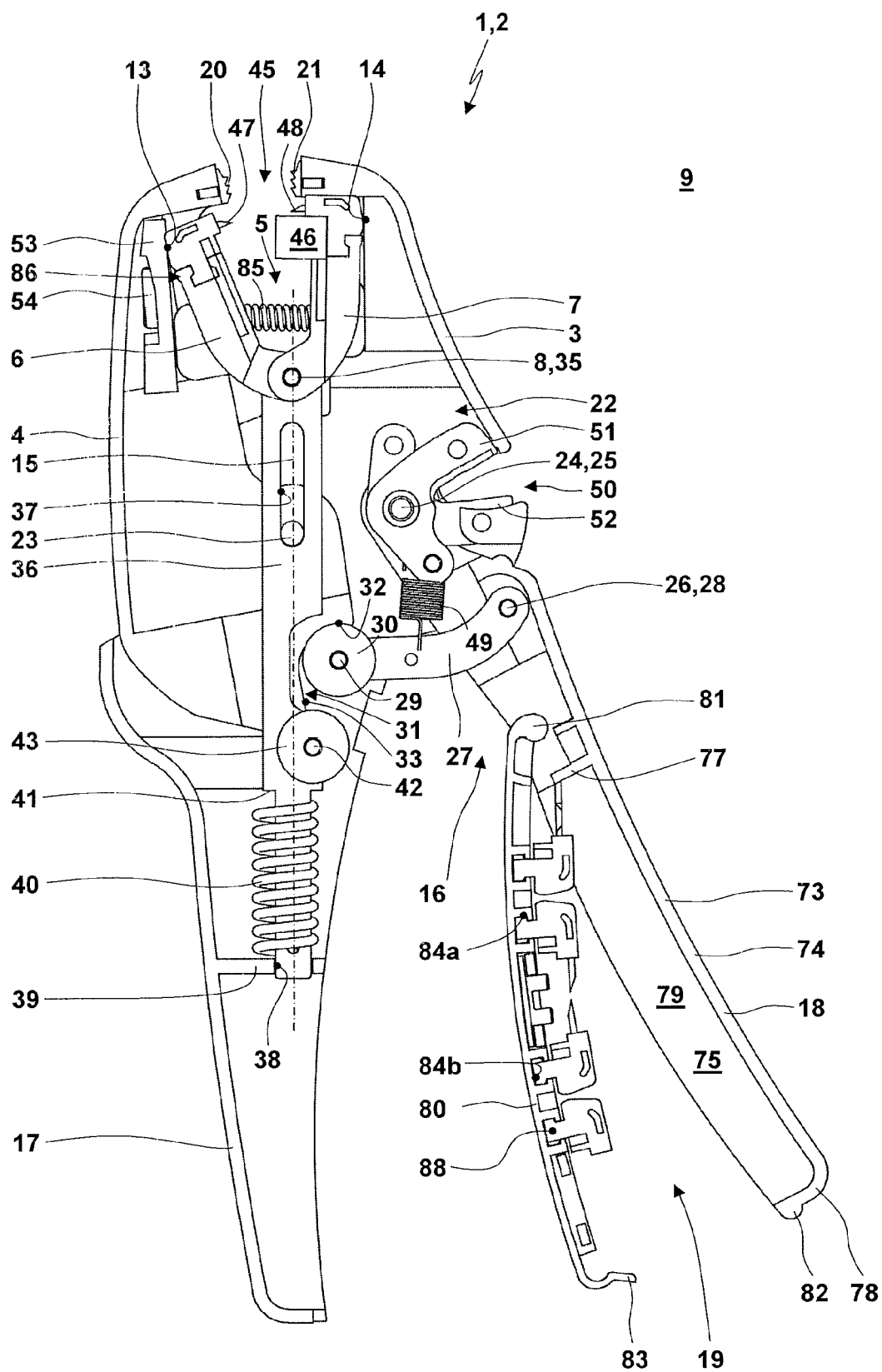
FIG. 2 shows the cable stripping pliers according to FIG. 1 in the insertion position with an opened storage unit in a section parallel to the plane of illustration of FIG. 1.

The construction and the kinematics of the cable stripping pliers 2 and the gear connection of the drive 16 may be seen from the cutaway view according to FIG. 2: The hand lever 17 and the pliers jaw 3 are unmovably connected to each other. With the pliers jaw 3 and the hand lever 17 therefore an unmovable or rigid pliers part 22 is formed. By the joint 12 the pliers jaw 4 is pivotally supported on the pliers part 22 in the pivot plane 9, which here is achieved by a bolt 23 fixed to the pliers part 22. By a joint 24 the hand lever 18 is pivotally supported on the pliers part 22 in the pivot plane 9, which here is achieved by a bolt 25. By a joint 26 an end portion of a pressure lever 27 is linked to the hand lever 18, which here is achieved by a bolt 28 fixed to the hand lever 18. In the other end portion of the pressure lever 27, via a mount 29 a roller 30 is pivotally supported on the pressure lever 27 in the pivot plane 9. The roller 30 rolls off a guide contour 31, which has a guide contour portion 32 (especially approximately quadrant-shaped), a guide contour portion 33 (especially straight and oriented approximately coaxial to the cable stripping axis 15) and a guide contour portion 34 (especially oriented approximately parallel the longitudinal axis of the pressure lever 27).

A bolt 35, by which the joint 8 of the cable stripping unit 5 is formed, also serves for the jointed connection of the cable stripping unit 5 with a draw shackle 36. The draw shackle 36 has only one translatory degree of freedom along the cable stripping axis 15. This degree of freedom is provided by a guiding of the draw shackle on the one hand by an elongated recess 37 of the draw shackle 36, in which the bolt 23 is guided essentially free of play perpendicular to the cable stripping axis 15. Furthermore the degree of freedom is provided by passing of the end portion of the draw shackle 36 facing away from the joint 8 through a guiding recess 38 of a wall 39 of the hand lever 17 having an orientation perpendicular to the cable stripping axis 15. The cable stripping stroke with a movement of the draw shackle 36 along the cable stripping axis 15 is achieved by the bias of a spring 40. For the embodiment shown the spring 40 is formed by a pressure spring wound in a coil-like way, which winds around the draw shackle 36 with several windings. One spring base of spring 40 is supported on the wall 39 while the other spring base is supported on the draw shackle 36, for example in the region of a ledge 41 of the draw shackle 36. A roller 43 is pivotally supported on the draw shackle 36 in the pivot plane 9 via a mount 42.

Figure 3:
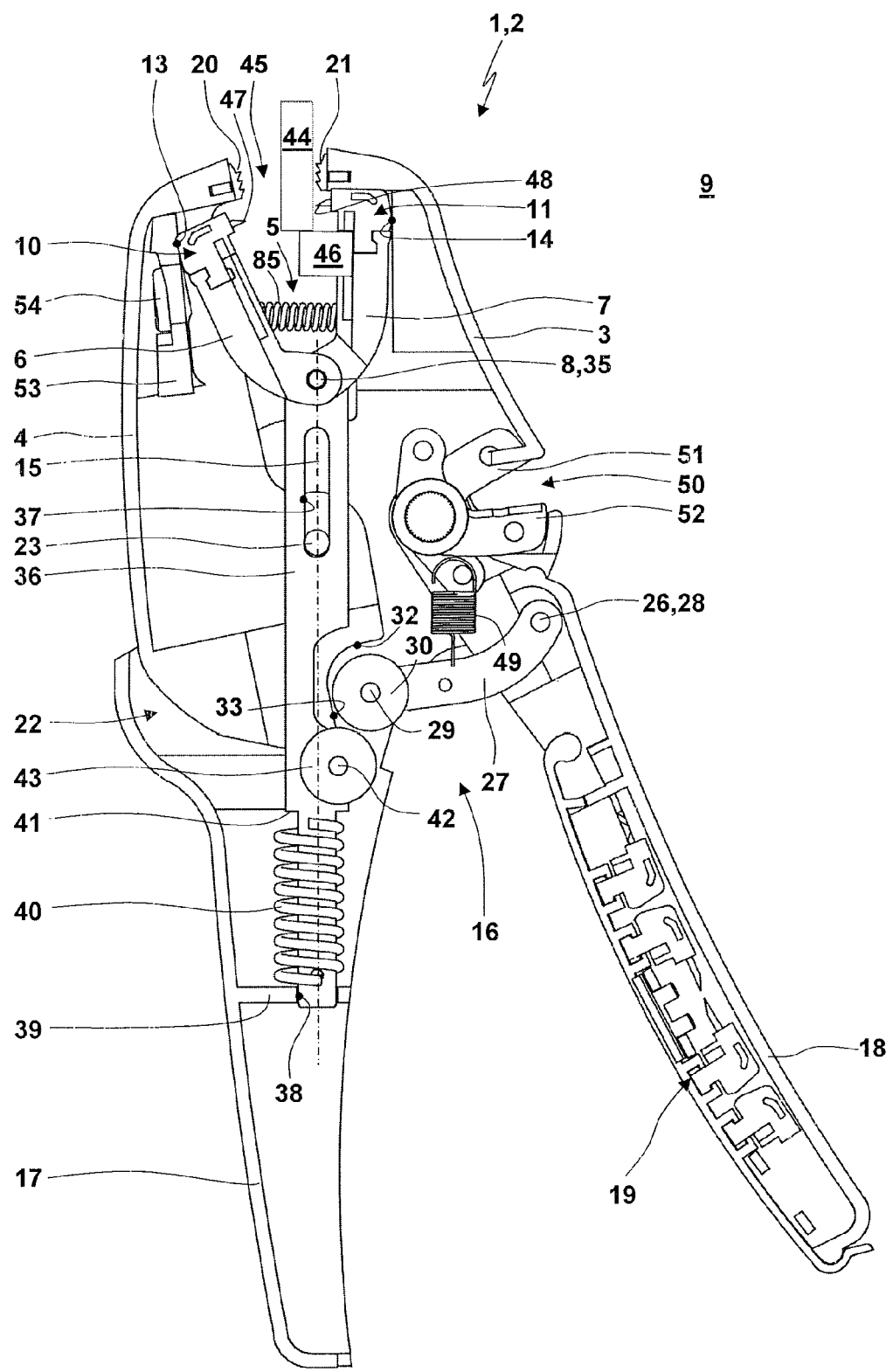
FIG. 3 shows the cable stripping pliers according to FIGS. 1 and 2 in the insertion position with a cable inserted and with closed storage unit in a section parallel to the plane of illustration of FIG. 1.

In the following a working stroke of the cable stripping pliers 2 is explained on the basis of FIGS. 3 to 6:

FIG. 3 shows the cable stripping pliers 2 in an insertion position. Without an application of hand forces onto the hand levers 17, 18 the hand levers 17, 18 as well as the pliers jaws 3, 4 and the cable stripping jaws 6, 7 take on the opening position to be seen in FIG. 3. This is achieved by a spring 85 which is preloaded also in the opening position and which acts upon the cable stripping jaws 6, 7 and with them the pliers jaws 3, 4 and the hand levers 17, 18 in an opening direction. In this insertion position it is possible to insert a cable 44 into a bit 45 formed by the pliers jaws 3, 4 and the cable stripping jaws 6, 7 with the cutting elements 10, 11 affixed thereto. The cable stripping jaw 7 and/or the cutting element 11 optionally has a distance element 46, which upon insertion of the cable 44 into the bit 45 is brought into contact with a front surface of the cable 44. This results in a defined distance of knives 47, 48 of the cutting elements 10, 11 from the front surface of the cable 44.

Figure 4:
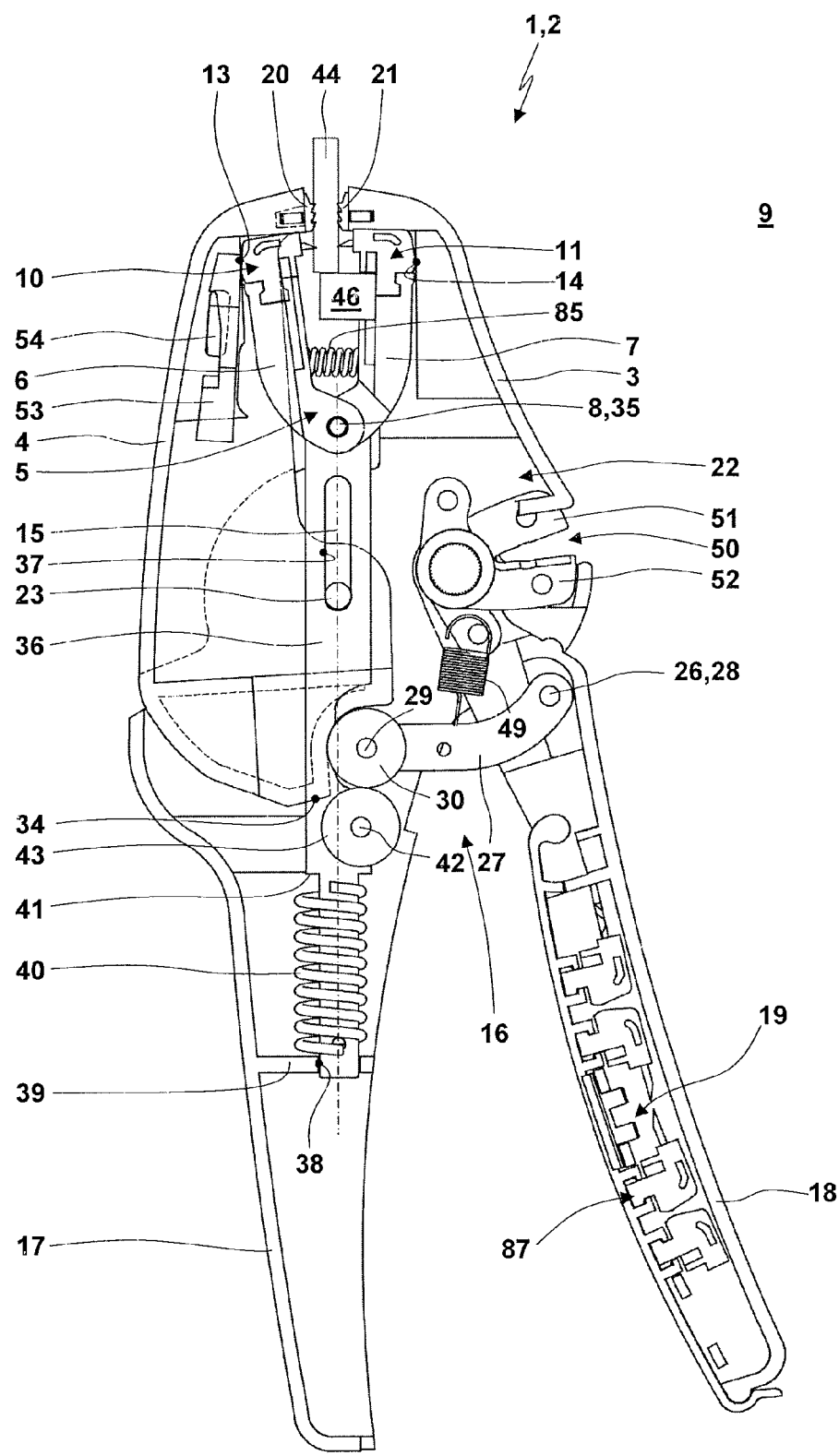
FIG. 4 shows the cable stripping pliers according to FIGS. 1 to 3 in a cutting and clamping position in a section parallel to the plane of illustration of FIG. 1, wherein compared to FIG. 3 the hand levers have been partially closed over a cutting stroke.

Beginning from this insertion position according to FIG. 3, a clamping and cutting stroke is achieved by a movement of the hand levers 17, 18 towards each other until the cutting position according to FIG. 4 is achieved. The movement of the hand lever 18 towards the hand lever 17 during the cutting and clamping strokes leads to the result that the pressure lever 27 is moved in the direction of the guiding contour 31. While in the start portion of the guiding contour portion 32 the roller 30 can still roll off the guiding contour 31 without applying significant forces to the pliers jaw 4, the inclination of the guiding contour portion 32 changes with continued rolling movement of the roller 30 along the guiding portion. In this way, an increasing force is applied by the pressure lever 27 upon the pliers jaw 4, so that an increasing force is applied to the pliers jaw 4 which is directed towards a pivoting of pliers jaw 4 towards the pliers jaw 3. After closing the bit 45, on the one hand the clamping force for the outer surface of the cable 44 evoked at the clamping jaws 20, 21 and on the other hand the cutting and contact forces of the knives 47, 48 of the cable stripping unit 5 counteract the actuating force generated by the pressure lever 27 and the roller 30 on the guiding contour portion 32 of the guiding contour 31. In the cutting position according to FIG. 4 the roller reaches the transition between the guiding contour portions 32, 33. In this cutting position according to FIG. 4, the roller 30 of the pressure lever 27 touches the roller 43 of the draw shackle 36.

Figure 5:
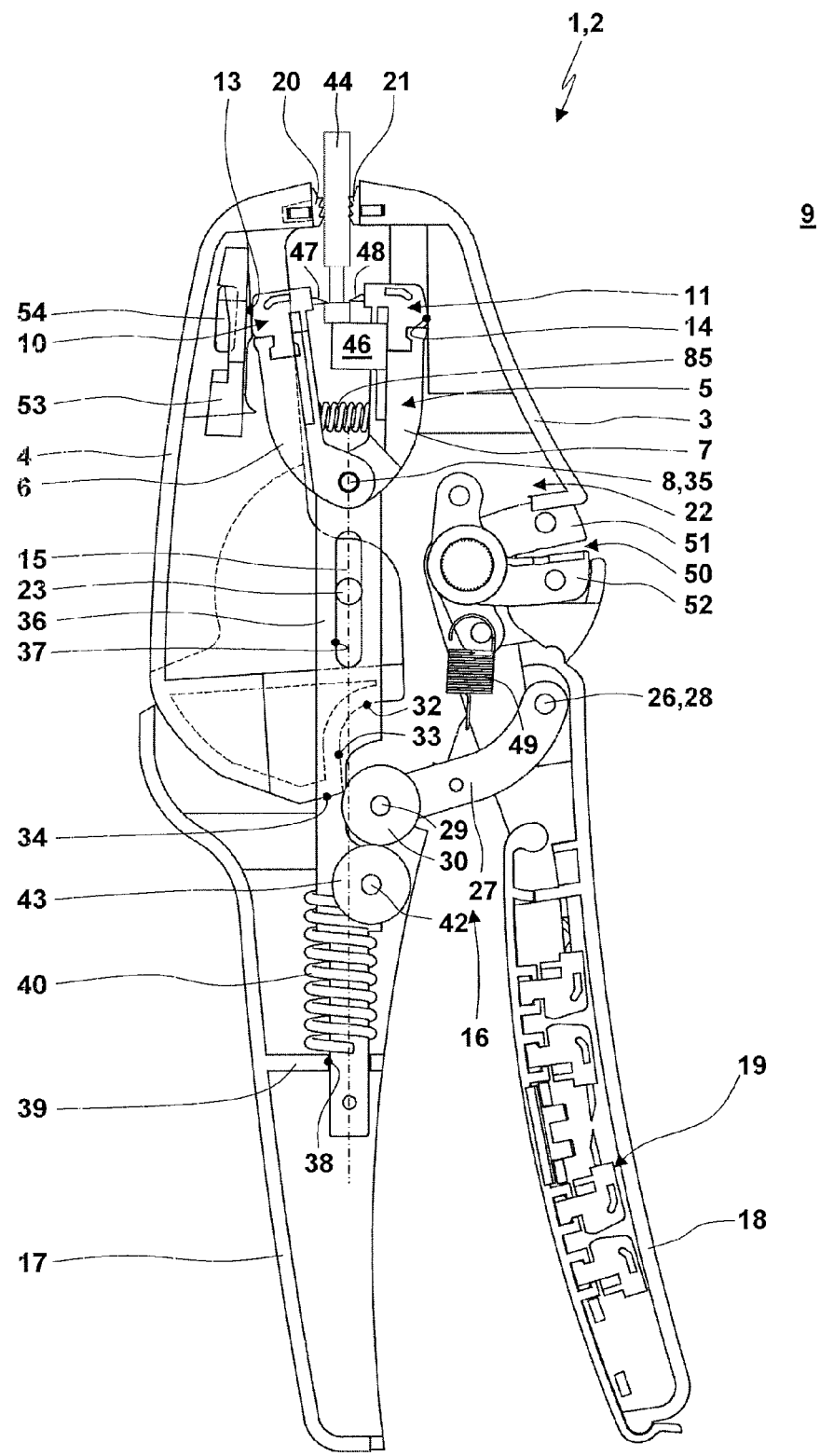
FIG. 5 shows the cable stripping pliers according to FIGS. 1 to 4 in a section parallel to the plane of illustration of FIG. 1 in a cable stripping position, wherein compared to FIG. 4 the hand levers have been further closed over a cable stripping stroke.

In the cutting position according to FIG. 4, the connecting axis between the joint 26 and the mount 29 of the pressure lever 27 forms an angle with the cable stripping axis 15 which is smaller than 90°. If in a subsequent cable stripping stroke to induce the stripped position according to FIG. 5 the actuating force applied upon the hand lever 18 is further increased, the orientation of the pressure lever 27 described above leads to a longitudinal force in the pressure lever 27 resulting in a force component which has an orientation parallel to the cable stripping axis 15. This force component is transmitted onto the roller 43 and therefore onto the draw shackle 36 by the roller 30 through a rolling contact. The force component causes a displacement of the roller 43 and the draw shackle 36 under increasing bias of the spring 40 along the cable stripping axis 15. Due to the coupling of the cable stripping unit 5 in the region of the joint 8, this is accompanied by a sliding movement of the cable stripping unit 5 relative to the pliers jaws 3, 4. Furthermore this cable stripping stroke is accompanied by a rolling movement of the roller 30 along the guiding contour portion 33, which again causes a growing pivoting of the pressure lever 27 with a reduction of the angle of the connecting axis of the joint 26 and the mount 29 with respect to the cable stripping axis. The force characteristics for this cable stripping stroke are influenced by the preloading and stiffness of the spring 40 and the friction characteristics for the sliding movement of the cable stripping unit 5 relative to the pliers jaws 3, 4 in the region of the contact surfaces 13, 14. Additionally, to influence the force characteristics, a further spring 49 may act upon the pressure lever 27. The cable stripping stroke explained above leads to the result that (after having severed the insulation by the knives 47, 48 within the cutting stroke) the knives 47, 48 are moved in a closed state relative to the cable 44 with a cable 44 generally being fixed in the region of the clamping jaws 20, 21, so that the axial portion cut free on the end side of the insulation is pulled off the conductor. The maximum cable stripping stroke is defined by the length of the guide contour portion 33. FIG. 5 shows the stripped position. In the stripped position the roller 30 has reached the transition region between the guiding contour portions 33, 34.

Figure 6:
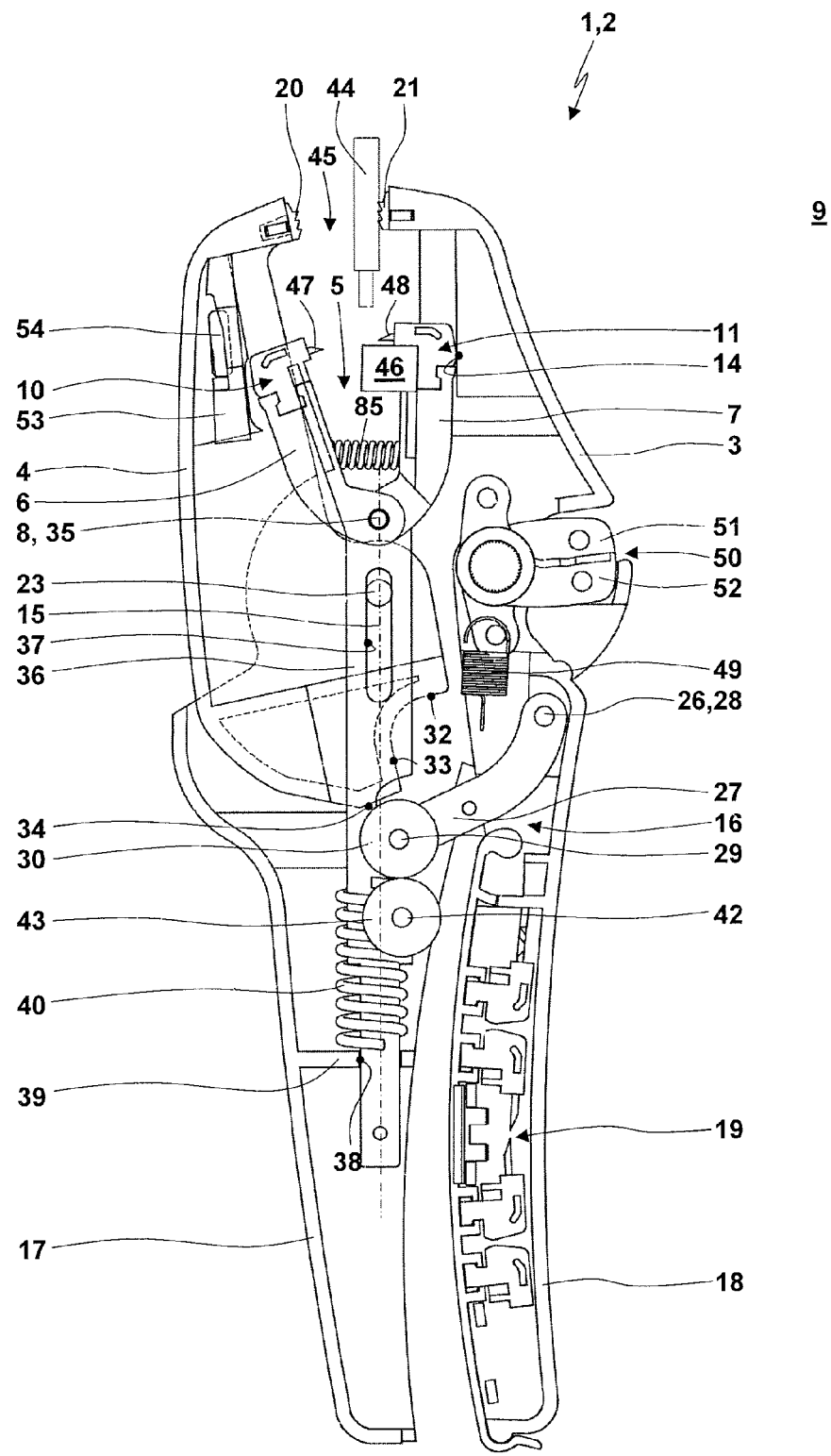
FIG. 6 shows the cable stripping pliers according to FIGS. 1 to 5 in a section parallel to the plane of illustration of FIG. 1 in an exchange and removal position, wherein compared to FIG. 5 the hand levers have been further closed.

With a further closing of the hand levers 17, 18, the roller 30 then can than roll off the guiding contour portion 34, at which point preferably the guiding contour portion 34 has an orientation approximately parallel to the connecting axis of the joint 26 and the mount 29. This on the one hand results in the hand levers 17, 18 being able to be closed further without further significant application of hand forces upon the hand levers 17, 18. On the other hand, the roller 30 then no longer forms an abutment for the pliers jaw 4, so that the spring 40 can transfer the cable stripping jaws 6, 7 and the pliers jaws 3, 4 back to the opening position. In this way, a removal position according to FIG. 6 is reached, in which the stripped cable 44 may be removed from the bit 45 now open again and the axial portion of the insulation drops out of the bit 45. At the same time the removal position according to FIG. 6 is an exchange position, which will be detailed in the following. When reaching the removal and exchange position according to FIG. 6, the working stroke of the cable stripping pliers 2 is ended.

With the removal of the hand forces applied to the hand levers 17, 18, the hand levers 17, 18 (caused by the springs 40, 39) return to the opened position. In this way, the insertion position according to FIG. 3 is again reached and another cable 44 can be stripped with the cable stripping pliers 2.

Optionally, the cable stripping pliers 2 are equipped with another tool, that is, a cutting mechanism 50, which is also operated by operating the hand levers 17, 18 and which encompasses two knives 51, 52. By closure of the hand levers 17, 18 the knives 51, 52 completely sever a cable inserted into the cutting mechanism 50 (for the design of the cutting mechanism and its connection to the hand levers via a gear drive cp. also the prior art given above).

The contact surface 14 for the cable stripping jaw 7 is formed directly by the pliers jaw 3. On the contrary, the contact surface 13 for the other cable stripping jaw 6 is formed by a support element 53, which by an adjustment element 54 can be shifted in such a way that depending on the position of the support element 53 a change in the pivot angle of the cable stripping jaws 6, 7 with respect to the pivot angle of the pliers jaws 3, 4 is possible. In this way, via the adjustment element and the setting of the position of the support element 53 it can be set how deep the knives 47, 48 cut into the cable 44, to be able to accommodate different thicknesses of insulation. For the embodiment shown, the adjusting element extends through a guide slit 55 of the pliers jaw 4, so that the latter may be displaced along the guide slit 55 by the user from the outside. The adjusting element 54 via contact surfaces inclined with respect to the guide slit 55 in the way of a double wedge operates the support element 53.

Figure 7:
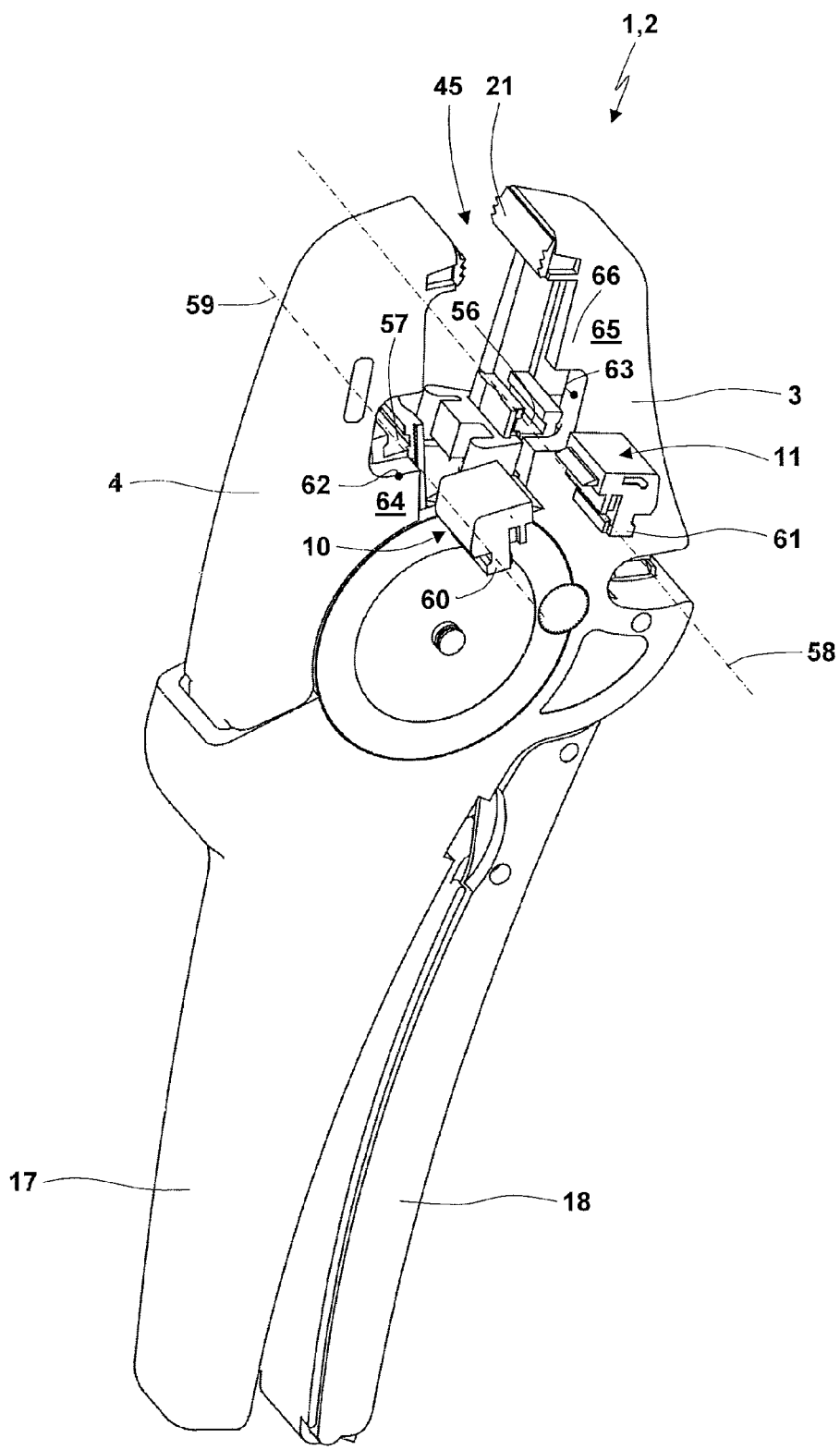
FIG. 7 shows the cable stripping pliers according to FIGS. 1 to 6 in a three-dimensional view with the cutting element demounted.

FIG. 7 shows the cable stripping pliers 2 in a three-dimensional view in the removal and exchange position. It can be seen that the front surfaces of the cable stripping jaws 6, 7 facing away from the joint 8 are each equipped with mounting grooves 56, 57. The longitudinal axes of the mounting grooves 56, 57 each form mounting axes 58, 59. In the direction of the mounting axes 58, 59 mounting elements 60, 61 of the cutting elements 10, 11 may be inserted into the mounting grooves 56, 57 of the cable stripping jaws 6, 7. The mounting grooves 56, 57 in the area of their bottom have extensions with which undercuts are formed. Accordingly, the mounting elements are realized as protrusions with extensions at their end sides, which engage with the undercuts of the mounting grooves 56, 57, forming a positively locked connection to accommodate any forces in the pivot plane 9. A securing of the cutting elements 10, 11 against the cable stripping jaws 6, 7 generally is achieved through the friction between the mounting grooves 56, 57 and the mounting elements 60, 61. Preferably, the mounting grooves 56, 57 as well as the mounting elements 60, 61 each have a cross section which in a rough approximation is T-shaped. The positively locking engagement of the mounting element 60, 61 into the mounting groove 56, 57 may also be formed by a dovetail joint 86.

The cutting element 10, 11 with its mounting element 60, 61 can only be inserted into the mounting groove 56, 57 in the exchange position according to FIG. 7, because in the exchange position the mounting groove 56, 57 is accessible through a recess or an incision 62, 63 of a side wall 64, 65 of the pliers jaw 3, 4 having an orientation parallel to the pivot plane 9. If the cable stripping pliers 2 leave the exchange position according to FIG. 7, the cable stripping jaws 6, 7 with the cutting elements 10, 11 held thereon are moved forwards with respect to the side wall 64, 65, so that the cutting elements 10, 11 are no longer accessible. It is rather the case that outside of the exchange position the cutting elements 10, 11 are caught between the side walls 64, 65 of the pliers jaws 3, 4 so that these (apart from possible play), cannot move along the mounting axes 58, 59 in a undesired way outside of the exchange position. As can be seen from FIG. 7, only one side wall of the pliers jaw may be equipped with a recess 62, 63, through which then mounting and demounting are performed, while the other side wall of the same pliers jaw is not equipped with such a recess. Therefore outside of the exchange position the side wall 64, 65 forms a securing element 66, which blocks the cutting element 10, 11 in the direction of the mounting axis 58, 59.

Figure 8:
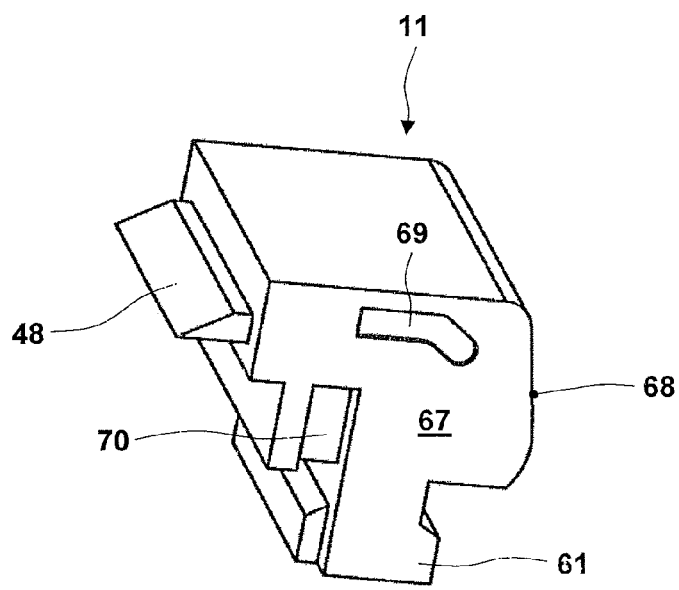
FIG. 8 shows a cutting element in a three-dimensional view.

FIG. 8 in a three-dimensional view in an exemplary way shows the cutting element 11 (while for the other cutting element 10 the same applies as appropriate). The cutting element 11 is e.g. formed by a knife 48 with a straight cutting edge, while it is possible to employ different cutting edges, for example with at least one concave cutting edge or two knife blades placed behind each other with a straight cutting edge each while the cutting edges are aligned in a V shape or lamella-like knives. The knife 48 has been encased with a holding body 67 made of plastic. The holding body 67 on the side facing away from the knife 48 forms a contact surface 68, by which the cutting element 11 may be supported on a corresponding contact surface 14 of the pliers jaw 3. Furthermore, in FIG. 8 the mounting element 61 can be seen which is formed with a ledge with a T-shaped extension in its end portion. Furthermore, in the side region of the holding body 67 handling surfaces 69 may be provided, which simplify manual handling of the cutting element 11. For example, the handling surfaces 69 may be roughened, to facilitate gripping by hand. It is possible that in the side region of the holding body 67 a guiding groove 70 is present, which is open in the direction of the related cable stripping jaw 7.

Figure 9:
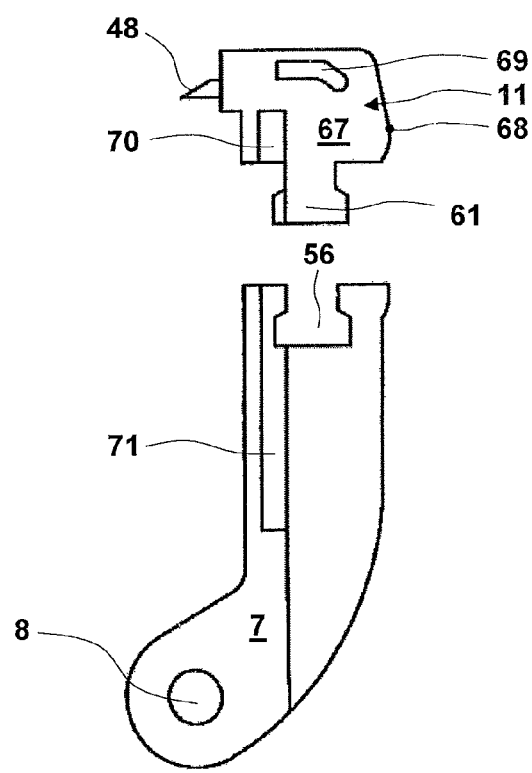
FIG. 9 in an exploded view shows a cutting element and the associated cable stripping jaw.

FIG. 9 shows a cable stripping jaw 7 with an associated cutting element 11 in a demounted state. The mounting axis 58 has an orientation vertical to the plane of illustration. The cable stripping jaw 7 has a guiding groove 71, too. With the mounting of the cutting element 11 to the cable stripping jaw 7, the guiding grooves 70, 71 complement one another so that a continuous straight guiding groove is formed. This commonly formed guiding groove serves for accommodating the distance element 46, which grips around the cable stripping jaw in a U-shape on the side oriented towards the bit 45, whereby angled portions formed on the end sides of the vertical arms of the U enter into the guiding grooves 70, 71. The distance element 46 is movable along guiding grooves 70, 71 for changing the length of the axial region of the insulation which is to be removed. Supplementary, a latching or locking or other fixing of a set position of the distance element may be provided which is not shown here (in this regard cp. e.g. DE 20 2008 014 111 U1). It is possible that in a demounted state the distance element 46 is put onto the guiding groove 70 of the cutting element 11 or the guiding groove 71 of the cable stripping jaw 7 and then the cutting element 11 is mounted with the cable stripping jaw 7. In this way the distance element 46 is caught in the common guiding groove formed with the guiding grooves 70, 71 in such a way that it cannot be lost. It is understood that the cable stripping jaw 6 and the cutting element 10 are formed correspondingly, possibly mirrored. The cutting elements 10, 11 for the two cable stripping jaws 6, 7 may also be formed identically, where these may then be mounted in a reverse orientation with the different cable stripping jaws 6, 7.

Figure 10:
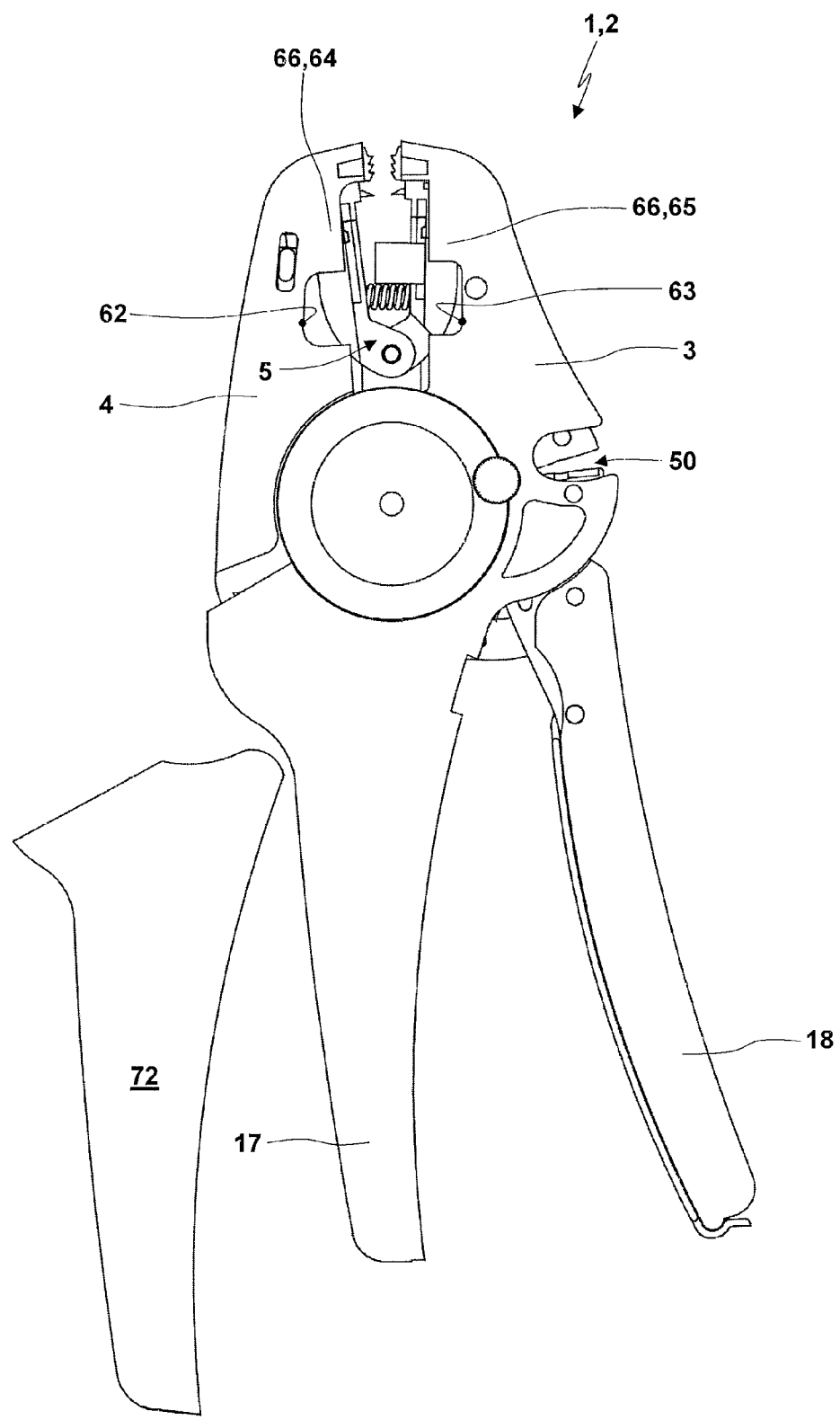
FIG. 10 shows a top view on cable stripping pliers with a hand lever, which is formed with a separate casing.

As can be seen from FIG. 10, at least one of the hand levers 17 may be equipped with a casing 72, which may be able to be slipped onto a base body of the hand lever, attached adhesively or in any other way to it. By the casing 72 an elasticity may be defined to induce a soft grip feeling. It is possible that by the casing 72 (for example by choice of shape or color) an individualization of the cable stripping pliers 2 for different customers is achieved. It is also possible that through the casing an adaptation to different sizes of hands of the user of the cable stripping pliers 2 is achieved.

As can be seen especially from FIGS. 1 and 2, the hand lever 18 which forms the storage unit 19 (which especially is the movable hand lever) is built with a base body 73. The base body 73 serves for applying and transferring operating forces and therefore has a corresponding stiffness. In the region of the storage unit 19 the base body 73 is U-shaped in rough approximation, where the opening of the U has an orientation in the direction of the other hand lever 17. The U-shaped cross section of the base body 73 is here formed with a base arm 74 and two side arms 75, 76 oriented approximately parallel. By the base body 73 an interior space 79 open in the direction of the hand lever 17 is formed. In the direction of the longitudinal axis of the hand lever 18 the interior space 79 of the base body 73 is limited on the one hand by a wall and on the other hand by a wall 78 of the hand lever 18 on the end side. The interior space 79 can be closed by a lid 80. The lid 80 is linked to the base body 73 via a pivot mount 81 outside the interior space 79 in the end portion facing towards the pliers head of the cable stripping pliers 2. FIGS. 1 and 2 show different positions of the lid 80, while FIG. 3 shows a closed position of the lid 80. The base body 73 in the region of the wall 78 placed in the free end portion of the hand lever 18 forms a snap lug 82. In the closed position of the lid 80 according to FIG. 3 an elastic angled portion 83 of the lid 80 locks or latches with the snap lug 82, in which way the closed position of the lid 80 is secured against unintended opening. On the inner side of the lid 80, mounting grooves 84 are provided, which have an orientation vertical to the pivot plane 9 and to the plane of movement of the hand levers 17, 18 as well as to the pivot plane of the lid 80. Cutting elements 10, 11 to be stored for an exchange may be inserted into the mounting grooves 84. While for an open lid 80 the cutting elements 10, 11 may be slid out of the mounting grooves 84 without further actions, it is not possible for the cutting elements 10, 11 to leave the mounting grooves 84 when the lid 80 is closed, because the leaving of the cutting elements 10, 11 is blocked by the walls of the base body 73 forming the side arms 75, 76. The mounting grooves 84 are, according to the mounting grooves 56, 57, formed in such a way that the mounting elements 60, 61 of the cutting elements 10, 11 may be used. The mounting grooves 84 set a mounting axis 88, which has an orientation perpendicular to the pivot plane 9 in which the hand levers 17, 18 are pivoted and has an orientation vertical to the plane of illustration according to FIG. 1. In the storage unit 19 the cutting elements are also held by dovetail joints 87. Additionally, it is possible to store clamping jaws 20, 21 in the storage unit 19. For this purpose on its inside the lid 80 can also have matching accommodation or mounting grooves.

For the embodiment shown, the cable stripping jaws 6, 7 are provided with the mounting grooves 56, 57, while the cutting elements 10, 11 are provided with the mounting elements 60, 61. It is also possible that the cable stripping jaws 6, 7 have the mounting elements 60, 61, while the mounting nuts 56, 57 are provided on the cutting elements 10, 11.

Within the scope of the present invention, an "exchange position", in which only mounting and demounting of the cutting elements 10, 11 is possible, encompasses a discrete position as well as a position region. It is also possible that there are several exchange positions.

Figure 11:
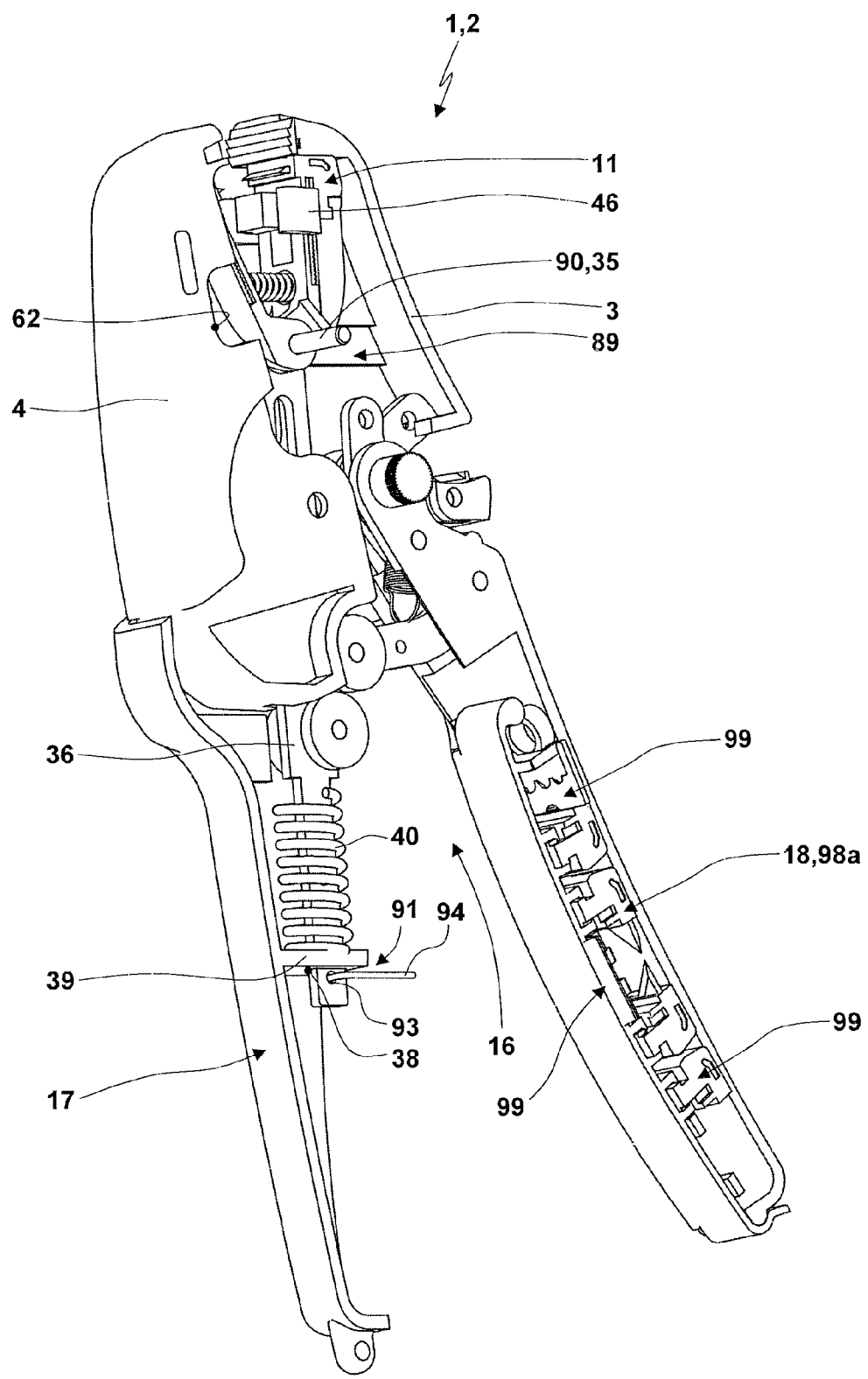
FIG. 11 in a partially-cut three-dimensional view shows another embodiment of cable stripping pliers.

FIG. 11 shows another embodiment of cable stripping pliers 2, which, barring further remarks, may generally be realized according to the cable stripping pliers 2 according to the FIGS. 1 to 10. In FIG. 11 the cable stripping pliers 2 are shown partly cut. Here parts of the hand levers 17, 18 and the pliers jaws 3 have been cut away. For this embodiment, the operating position of the cable stripping pliers 2 may not be changed only by actuation of the drive 16 formed with the hand levers 17, 18, which is responsible for applying the operating forces for processing the work piece, especially for the severing of the insulation in the cutting stroke and the stripping in the cable stripping stroke. Rather a manual change of an operating position and especially the manual inducement of an exchange position is possible also by another drive 89, which can be operated without pivoting the hand levers 17, 18 and which is not used for processing the work piece. The other drive 89 is formed with a manual operating element 90. For the embodiment shown, the operating element 90 is formed with the bolt 35, which is here led out of a housing of the cable stripping pliers 2 through a slit (not shown) or which is freely accessible from the outside. It is possible that the operating element 90 is guided by a slit in a housing related to the rigid pliers part 22 along the cable stripping axis 15. In the insertion position of the cable stripping pliers 2 shown in FIG. 11 the operating element 90 is manually displaced in the direction of the cable stripping axis 15. This leads to a shift of the draw shackle 36 along the cable stripping axis 15. Here the forces manually applied must be sufficient to overcome the force of the spring 40. While the pliers jaws 3, 4, the pressure lever 27 and the hand levers 17, 18 during this operation of the drive 89 may keep their position, the movement of the draw shackle 36 due to the coupling via the joint 8 also leads to a movement of the cable stripping unit 5 along the cable stripping axis 15. Therefore, there will be a relative shift between the cable stripping jaws 6, 7 and the cutting elements 10, 11 mounted on them on the one hand and the pliers jaws 3, 4 on the other hand until the cutting elements 10, 11 are placed in the region of the recesses 62, 63 of the side walls 64, 65 of the pliers jaws 3, 4. In this way an exchange position is reached in which the cutting elements may be demounted along the mounting axis 58, 59 and new cutting elements 10*a*, 10*b* may be mounted.

It is possible that (to keep up an exchange position induced in this way) the operating element 90 still has to have pressure applied on it manually, so that the spring 40 is not able to cause a movement out of the exchange position. However, it is also possible that in the exchange position induced in this way a locking or latching mechanism 91 comes into effect, which secures the exchange position. In this way, the locking or latching mechanism may lock or latch any construction element which is moved for the inducement of the exchange position. If a latching mechanism is used, this may generate a latching force which is larger than the force generated by the spring 40. In this case, overcoming of the latching force is achieved by complementing the force of the spring 40 with loosening forces applied manually to the operating element 90, which are directed away from the exchange position. For the case that a locking mechanism is employed, a locked position may be left by manual removal of a locking element.

Figure 12:
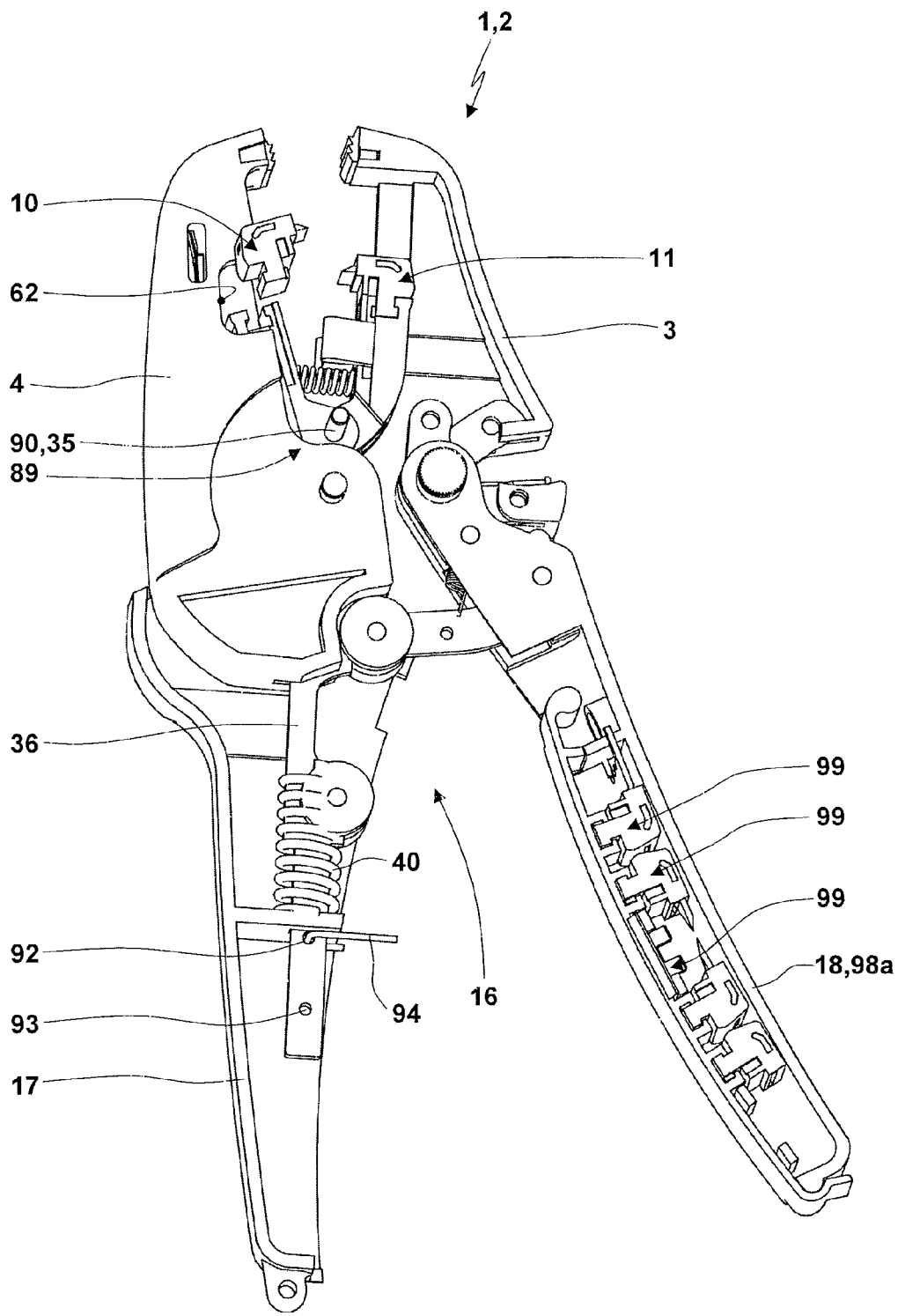
FIG. 12 in a changed partially-cut three-dimensional view shows the cable stripping pliers according to FIG. 11.

FIGS. 11 and 12 only show an exemplary embodiment of a locking or latching mechanism 91 without the invention being intended to be limited to this embodiment. Here, the draw shackle 36 in the end portion which extends through the recess 38 in the wall 39 of the hand lever 17 is equipped with two axially distanced bores 92, 93. By means of a locking element 94 which can be inserted into the bores 92, 93 (here a wire bracket) different axial positions of the draw shackle 36 can be secured. For the embodiment shown, a positively locked securing and therefore locking of the exchange position is possible by inserting the locking element 94 into the bore 92 according to FIG. 12. As can also be seen from FIG. 12, by operating the drive 89 removal of the cutting elements 10, 11 is also possible in the insertion position of the pliers jaws 3,4 and the hand levers 17, 18, so that as an alternative an exchange is possible in the insertion position and in the removal position.

It is also possible, however, that the exchange is only possible in an exchange position induced by the drive 89, in which case a removal position may entirely be dispensed with and removal may be performed in the insertion position.

According to the invention, in at least one of the drives 16, 89 a movement-controlled freeing of the cutting elements 10, 11 is used.

It is possible that in the storage unit 19 also cutting elements 51, 52 of the cutting mechanism 50 to be disposed for an exchange are stored.

Alternatively or cumulatively to an integration of the storage unit 19 into a hand lever 18, a storage unit 19 may also be integrated into a pliers head 95. For the shown embodiment according to FIG. 13 storage units 19*a* and 19*b* are integrated into the pliers head 95. The storage unit 19*a* is integrated into the pliers part 22, here the pliers jaw 3. On the contrary, the storage unit 19*b* is integrated into the movable pliers jaw 4. The pliers jaws 3, 4 each have a recess 96*a*, 96*b*, which can (at least partly) be closed by a lid 80*a*, 80*b*.

Figure 13:
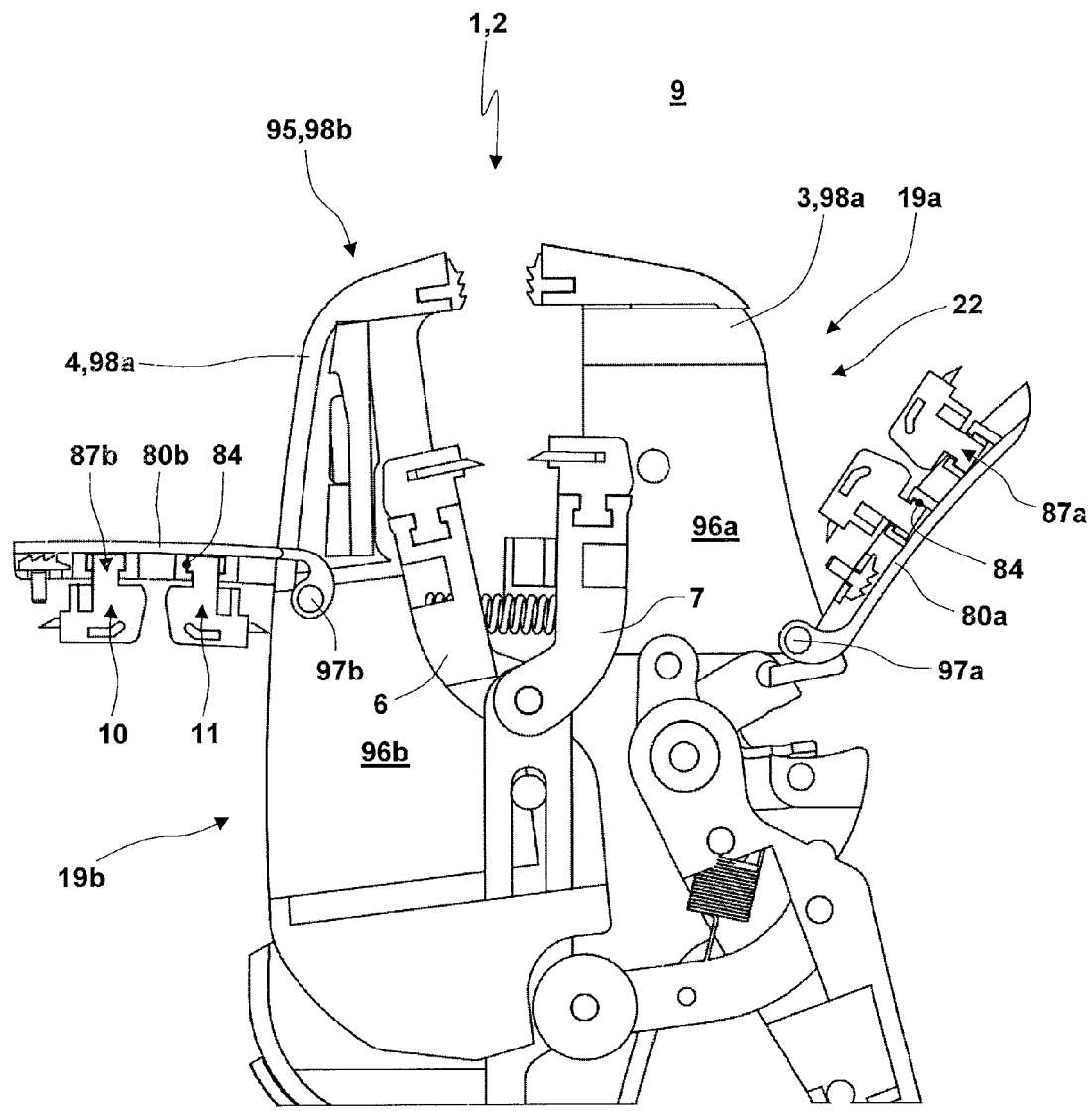
FIG. 13 shows a pliers head of other cable stripping pliers with storage units for accessories integrated into the pliers head with the storage units shown in an open position here.

For the embodiment shown, the lids 80*a*, 80*b* are pivotally linked to the pliers jaws 3, 4 in the region of a joint 97*a*, 97*b*, where the pivot axis of the joint 97*a*, 97*b* has an orientation vertical to the plane of illustration according to FIG. 13 and to the pivot plane 9 of the pliers jaws 3, 4. On the lids 80*a*, 80*b*, accessories such as the cutting elements 10, 11, the clamping jaws 20, 21 and/or knives 51, 52 are detachably held, as this has been described for the storage unit 19 located in the region of the hand lever 18. Preferably these accessories are held on the lid 80*a*, 80*b* by a dovetail joint 87*a*, 87*b*. For this purpose the lids 80*a*, 80*b* may have mounting grooves 84 having undercuts, the longitudinal axes of which define a mounting axis 88, which has an orientation vertical to the pivot plane 9 of the pliers jaws 3, 4. It is understood that of the two storage units 19*a*, 19*b* only one storage unit may be provided on a pliers head.

For the embodiment shown, the recess 96*a* of the storage unit 19*a* is located between the front end portion of the pliers jaw 3 (on which the clamping jaw 21 is held) and the joint 24. At least partly, the recess 96*a* extends laterally with respect to the cable stripping jaw 7 which is guided slidably with respect to the pliers jaw 3. Preferably a wall not shown in FIG. 13 on the one hand provides the bottom of the recess 96*a*. On the other hand this wall provides a sliding surface for a sliding guidance of the cable stripping jaw 7 with respect to the pliers jaw 3. Contrary to that, the storage unit 19*b* is placed approximately in the region of the joint 12, that is, to the side of the latter.

Figure 14:
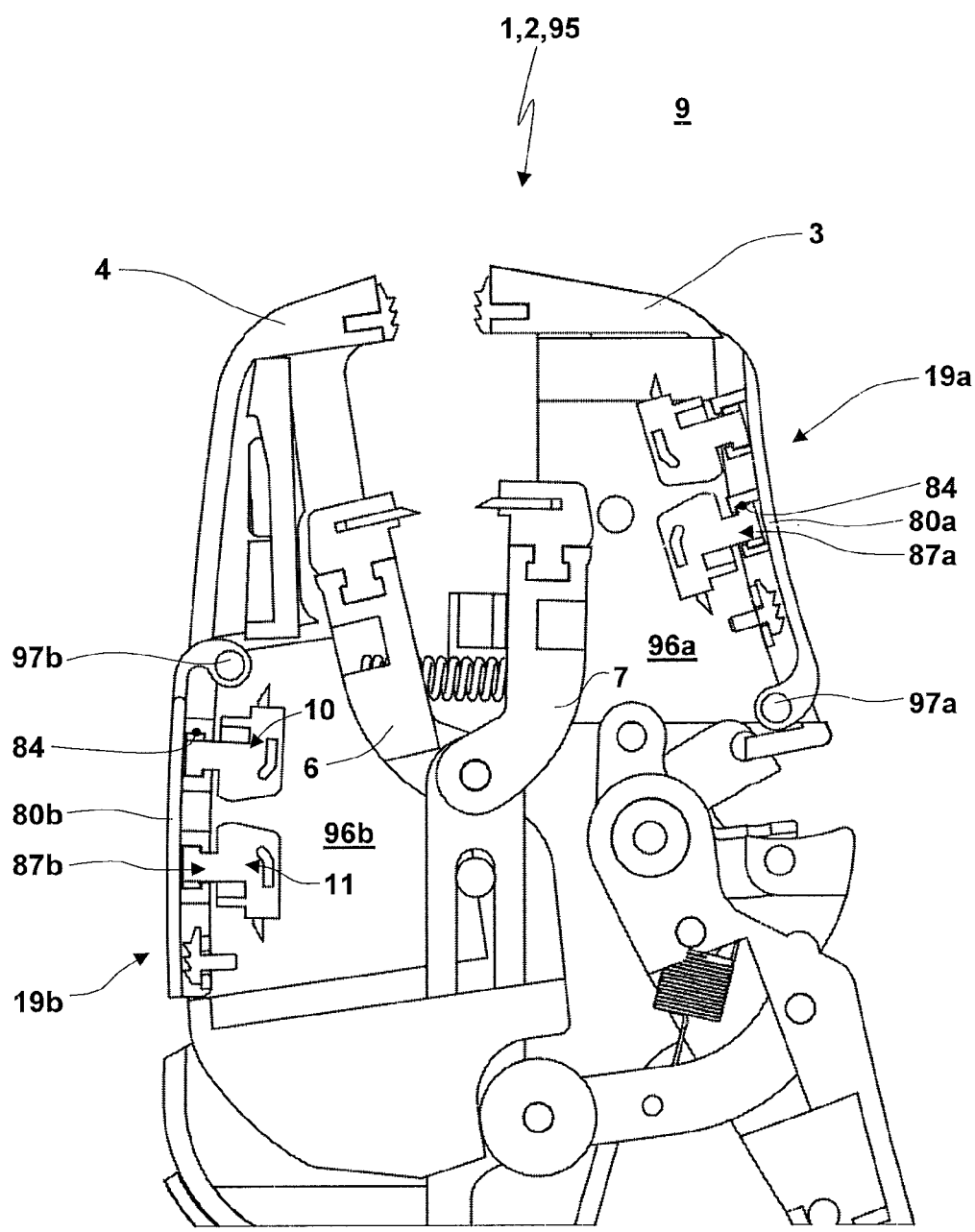
FIG. 14 shows the pliers head according to FIG. 13, with the storage units shown in a closed position here.

The lids 80*a*, 80*b* may in their closed position according to FIG. 14 be locked, latched or secured otherwise on the pliers jaws 3, 4, without this being shown in detail in the FIGS. 13 and 14. It is also possible that

- the lids 80*a*, 80*b* are not pivotally mounted on the pliers jaws 3, 4 but are detachable,
- the accessories are not held on the lid, but on the pliers jaws 3, 4 in the interior spaces 96*a*, 96*b* and/or
- the lids 80*a*, 80 are pivotable in another direction (for example around a pivot axis, which lies in the plane of projection according to FIGS. 13 and 14) or are detachable or mountable in another direction.

The storage units 19, 19*a*, 19*b* are each formed in a pliers part 98, where this is preferably realized as a hand lever 18, a pliers jaw 3, 4 or a pliers head 95. The storage unit 19 serves for storing at least one accessory 99 or different accessories, which may be for example a cutting element 10, 11, a clamping jaw 20, 21, a knife 51, 52 and/or a crimping die for crimping pliers.

Many variations and modifications may be made to the preferred embodiments of the invention without departing substantially from the spirit and principles of the invention. All such modifications and variations are intended to be included herein within the scope of the present invention, as defined by the following claims.

I claim:

1. A cable stripping tool comprising:
   a) two pliers jaws connected to each other by a joint for being pivoted in a pivot plane,
   b) a cable stripping unit accommodated between the pliers jaws and comprising two cable stripping jaws connected to each other by a joint for being pivoted in the pivot plane and carrying cutting elements in their free end regions,
   c) where contact surfaces of the pliers jaws contact the cable stripping jaws for causing a coinciding pivoting movement of the pliers jaws towards each other and a pivoting movement of the cable stripping jaws,
   d) where a sliding contact of the contact surfaces of the pliers jaws with the cable stripping jaws provides that the cable stripping unit with the cable stripping jaws is able to slide along a cable stripping axis relative to the pliers jaws,
   e) a drive comprising a connection means connected to the pliers jaws and the cable stripping unit, the connection means comprising at least one lever and at least one roller, said connection means being designed and configured for providing during a working stroke:
      a cutting stroke wherein by means of the drive the two cable stripping jaws are pivoted towards each other in the pivot plane with a common pivoting of the pliers jaws and of the cable stripping jaws, and
      a cable stripping stroke that follows the cutting stroke and wherein by means of the drive the two cable stripping jaws are moved along the cable stripping axis without a change of their pivoting angle,
   f) said cutting elements each being exchangeably held on a respective cable stripping jaw by a positive locking engagement of a mounting element with a mounting groove defining a mounting axis having an orientation vertical to the pivot plane and to the cable stripping axis such that the cutting elements each is mounted with the respective cable stripping jaw in such a way that they may be disassembled and removed along the mounting axis,
   g) where outside from an exchange position each of the cutting elements is blocked by a respective securing element with respect to a movement along the mounting axis and in the exchange position the respective securing element has been moved away from each of the cutting elements such that each of the cutting elements is no longer blocked by the respective securing element and each of the cutting elements is freed with respect to a movement along the mounting axis for demounting each of the cutting elements, and
   h) the exchange position is induced in a movement-controlled way by the movement of the cable stripping unit by means of the drive along the cable stripping axis.

2. The cable stripping tool according to claim 1, wherein
   a) the cable stripping jaws form the mounting grooves and
   b) the cutting elements form the mounting elements.

3. The cable stripping tool according to claim 1, wherein each of the cutting elements is formed with
   a) a knife and
   b) a holding body,
      ba) on which the knife is held and
      bb) which forms the mounting groove or the mounting element.

4. The cable stripping tool according to claim 3, wherein each of the cutting elements is formed integrally with:
   a) the knife and
   b) the holding body,
      ba) on which in a material-bonded way the knife is held and
      bb) which forms the mounting groove for the exchangeable attachment of the cutting element to a cable stripping jaw.

5. The cable stripping tool according to claim 4, wherein at least one of the cutting elements comprises a guiding or holding means for a distance element.

6. The cable stripping tool according to claim 1, wherein the exchange position is located at the end of the working stroke of the cable stripping tool.

7. The cable stripping tool according to claim 6, wherein the exchange position also builds a removal position for the stripped work piece.

8. The cable stripping tool according to claim 1, wherein the cable stripping tool comprises:
   a) an insertion position, in which a work piece is inserted into the cable stripping tool,
   b) a clamping position, in which the work piece is clamped between clamping jaws of the cable stripping tool, and/or a cutting position, in which the work piece is partially cut by the cutting elements, and
   c) a removal position, in which the work piece can be removed from the cable stripping tool,
   d) wherein:
      the insertion position,
      the clamping position and/or the cutting position, and
      a stripped position
      are arranged over the working stroke of the cable stripping tool following one another in the aforementioned order.

9. The cable stripping tool according to claim 1, wherein the cable stripping tool has a storage unit for storage of at least one cutting element and/or at least one clamping element.

10. The cable stripping tool according to claim 9, wherein the storage unit is located in the region of a hand lever, a pliers head, or a pliers jaw of the cable stripping tool.

11. The cable stripping tool according to claim 10, wherein a base body of the hand lever has an open cross section, which can at least partially be closed by a lid, and at least one of the cutting elements and the clamping elements is arranged in an interior space of the hand lever, which is limited by the lid and the open cross section of the base body.

12. The cable stripping tool according to claim 11, wherein at least one of the cutting elements and the clamping elements is held by the lid.

13. The cable stripping tool according to claim 12, wherein the lid is located on that side of the base body which faces towards another hand lever.

14. The cable stripping tool according to claim 12, wherein the lid is supported pivotably on the base body of the hand lever.

15. The cable stripping tool according to claim 14, wherein the lid is supported on the base body in its end portion facing towards a pliers head.

16. The cable stripping tool according to claim 14, wherein in a closed position the lid is locked or latched to the base body of the hand lever.

17. The cable stripping tool according to claim 11, wherein the lid is located on that side of the base body which faces towards another hand lever.

18. The cable stripping tool according to claim 11, wherein in a closed position the lid is locked or latched to the base body of the hand lever.

* * * * *